United States Patent
Tanaka

(10) Patent No.: US 9,363,493 B2
(45) Date of Patent: Jun. 7, 2016

(54) IMAGE PROCESSING APPARATUS, METHOD, RECORDING MEDIUM AND IMAGE PICKUP APPARATUS

(71) Applicant: FUJIFILM Corporation, Tokyo (JP)

(72) Inventor: Seiji Tanaka, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/632,630

(22) Filed: Feb. 26, 2015

(65) Prior Publication Data

US 2015/0172615 A1 Jun. 18, 2015

Related U.S. Application Data

(63) Continuation of application No. PCT/JP2013/072278, filed on Aug. 21, 2013.

(30) Foreign Application Priority Data

Aug. 27, 2012 (JP) .................................. 2012-186645

(51) Int. Cl.
| | |
|---|---|
| *H04N 9/64* | (2006.01) |
| *H04N 9/04* | (2006.01) |
| *G06T 7/40* | (2006.01) |
| *G06T 3/40* | (2006.01) |

(52) U.S. Cl.
CPC .............. *H04N 9/646* (2013.01); *G06T 3/4015* (2013.01); *G06T 7/408* (2013.01); *H04N 9/045* (2013.01)

(58) Field of Classification Search
CPC ...... H04N 9/646; H04N 9/045; G06T 3/4015; G06T 7/408
USPC ........ 348/273, 280, 242, 222.1; 382/300, 167
See application file for complete search history.

(56) References Cited

U.S. PATENT DOCUMENTS

| | | | | |
|---|---|---|---|---|
| 5,552,827 A | * | 9/1996 | Maenaka | ............... H04N 9/045 348/266 |
| 5,889,554 A | | 3/1999 | Mutze | |
| | | (Continued) | | |

FOREIGN PATENT DOCUMENTS

| | | |
|---|---|---|
| EP | 1793620 A1 | 6/2007 |
| JP | 2-210996 A | 1/2000 |
| JP | 2000-023174 A | 1/2000 |
| JP | 2011-182354 A | 9/2011 |
| WO | WO 2012/117583 A1 | 9/2012 |

OTHER PUBLICATIONS

Extended European Search Report (EESR) issued in EP11859479.5 dated Aug. 4, 2014.

(Continued)

*Primary Examiner* — Nhan T Tran
(74) *Attorney, Agent, or Firm* — Birch, Stewart, Kolasch & Birch, LLP

(57) ABSTRACT

Calculation of GR and GB color ratios in a local area uses a weighted average filter having weighting coefficients where the ratio of total sums of weighting coefficients for G and R pixels is 1:1, and weighted average filter having weighting coefficients where the ratio of total sum of weighting coefficients for G and B pixels is 1:1, respectively, on pixel lines in a horizontal direction and a vertical direction in a kernel. R and B pixel values are then calculated by interpolating the pixel value of a pixel to be processed with the G pixel value at the pixel position to be subjected to a demosaic process and the color ratio.

16 Claims, 13 Drawing Sheets

(56) References Cited

U.S. PATENT DOCUMENTS

| | | | |
|---|---|---|---|
| 6,714,242 B1* | 3/2004 | Kobayashi | G06T 3/4015 348/272 |
| 6,882,365 B1* | 4/2005 | Aoki | H04N 9/045 348/221.1 |
| 2006/0012841 A1* | 1/2006 | Tsukioka | H04N 9/045 358/518 |
| 2009/0200451 A1 | 8/2009 | Conners | |
| 2012/0293695 A1* | 11/2012 | Tanaka | H04N 9/045 348/273 |
| 2013/0216130 A1* | 8/2013 | Saito | G06T 3/4015 382/167 |
| 2014/0204248 A1* | 7/2014 | Kawai | H04N 5/367 348/246 |

OTHER PUBLICATIONS

Extended European Search Report (EESR) issued in EP11859950.5 dated Oct. 28, 2014.

Extended European Search Report (EESR) issued in EP12804973.1 dated Jan. 27, 2015.

Hirakawa et al., "Spatia-Spectral Color Filter Array Design for Optimal Image Recovery", IEEE Transactions on Image Processing, vol. 17, No. 10, Oct. 2008, pp. 1876-1890.

International Search Report issued in PCT/JP2013/072278, mailed on Oct. 1, 2013.

Written Opinion issued in PCT/JP2013/072278, mailed on Oct. 1, 2013.

* cited by examiner

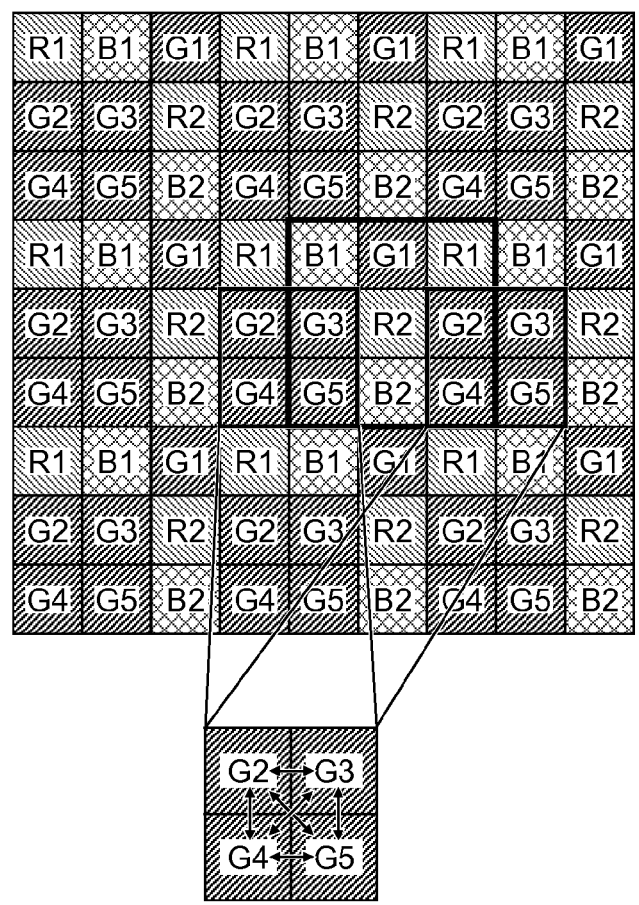

FIG.7A
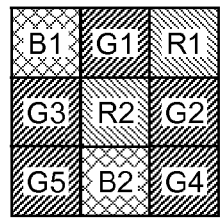
FIG.7B
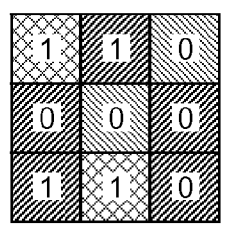
FIG.8

| | B | | | | |
|---|---|---|---|---|---|
|W~ 0|0|1|0|2|1|
|R~ 1|2|3|0|2|0|
|G~ 0|0|1|0|2|1|
|0|2|1|1|0|0|
|0|2|0|1|2|3|
|1|2|0|0|0|1|

FIG.17B

| 0 | 3 | 1 | 1 | 0 | 1 |
|---|---|---|---|---|---|
| 0 | 2 | 0 | 1 | 2 | 3 |
| 0 | 1 | 1 | 0 | 0 | 0 |
| 0 | 0 | 1 | 0 | 2 | 1 |
| 1 | 2 | 4 | 0 | 3 | 0 |
| 1 | 0 | 1 | 0 | 3 | 1 |

VERTICAL
DIRECTION (V)

HORIZONTAL DIRECTION (H)

__NUM__US 9,363,493 B2__NUM__

IMAGE PROCESSING APPARATUS, METHOD, RECORDING MEDIUM AND IMAGE PICKUP APPARATUS

CROSS-REFERENCE TO RELATED APPLICATIONS

This application is a Continuation of PCT International Application No. PCT/JP2013/072278 filed on Aug. 21, 2013, which claims priority under 35 U.S.C §119(a) to Japanese Patent Application No. 2012-186645 filed on Aug. 27, 2012. Each of the above applications is hereby expressly incorporated by reference, in their entirety, into the present application.

BACKGROUND OF THE INVENTION

1. Field of the Invention

The present invention relates to an image processing apparatus, a method, a program and a recording medium, and an image pickup apparatus, and in particular to a technique of reducing occurrence of color moire.

2. Description of the Related Art

In an image pickup apparatus including a single-element color image pickup element, an output image of the color image pickup element is a RAW image (mosaic image). Accordingly, a multi-channel image is acquired by simultaneous processing (alternatively, referred to as a demosaic process; hereinafter, the same shall apply) that interpolates missing pixels with surrounding pixels.

Japanese Patent Application Laid-Open No. 2011-182354 (PTL 1) describes that an interpolation process is performed with an assumption that color ratios of red (R), green (G) and blue (B) are kept substantially constant in a local area during a demosaic process. For instance, low frequency components mR', mG and mB' of R, G and B signals are acquired for 7×7-pixel input pixel units adopting, as a center pixel, a pixel to be subjected to a demosaic process. The pixel values of R and B pixels on a G pixel in the case where the pixel to be processed is the G pixel are estimated as R=(mR'/mG)g and B=(mB'/mG)g on the basis of the pixel value g of the G pixel and color ratios in a local region (mR'/mG, mB'/mG).

The low frequency components mR', mG and mB' of R, G and B signals for 7×7-pixel input pixel units are acquired through calculation of a weighted average value by a convolution operation between an RGB signal in 7×7-pixel input pixel units and weighting coefficients where a high weighting coefficients is assigned to the center (FIGS. 24 and 26 in PTL 1).

SUMMARY OF THE INVENTION

The invention described in PTL 1 relates to a demosaic process for a mosaic image having an RGBW array acquired from an image pickup element having white (W) pixels in addition to RGB pixels. The invention described in PTL 1 does not reduce turning color (color moire) caused by aliasing of high frequency signals exceeding the reproduction bands of the respective colors and deviation in phase between colors.

Upon incidence of a vertically-striped pattern or a horizontally-striped pattern (high frequency signal image) onto an image pickup element, calculation of the RGB color ratios (R/G and B/G) in a local area using the weighted coefficients described in PTL 1 does not hold the assumption that the RGB color ratios in a local area is kept substantially constant. A demosaic process based on the color ratios causes a problem of occurrence of color moire.

The present invention is made in view of such situations, and has an object to provide an image processing apparatus, a method, a program and a recording medium, and an image pickup apparatus that can reduce occurrence of color moire through simple image processing.

In order to achieve the foregoing object, one embodiment of the present invention includes: image acquisition means configured to acquire a mosaic image which is acquired from an image pickup element provided with color filters according to a predetermined color filter array and corresponds to the color filter array, the color filters including first filters corresponding to at least one first color, and second filters corresponding to at least two second colors having a lower contribution ratio for acquiring a luminance signal than the first color, the color filters being placed on a plurality of pixels including photo-electric conversion elements arranged in a first direction and a second direction which is perpendicular to the first direction; operation means configured to calculate a product-sum operation value for the first color and a product-sum operation value for each color among the second colors, based on first weighting coefficients and second weighting coefficients and on a pixel value of a pixel of the first color and a pixel value of a pixel of each color of the second colors in a local area extracted from the mosaic image and corresponding to a predetermined kernel size, the operation means having the first weighting coefficients configured to correspond to each color among the second colors and correspond to the first color in the predetermined kernel size, and the second weighting coefficients configured to correspond to each color among the second colors, the first weighting coefficients and the second weighting coefficients being configured such that a ratio between a total sum of the first weighting coefficients and a total sum of the second weighting coefficients on pixel lines in the first direction and the second direction in the kernel size is 1:1; and image processing means configured to calculate a pixel value of each color of the second colors at a pixel position of each pixel to be processed in the local area, based on the pixel value of the first color at the pixel position, and the product-sum operation value for the first color and the product-sum operation value for each color among the second colors calculated by the operation means.

According to one embodiment of the present invention, in order to acquire color information on the local area in the mosaic image, the operation means calculates the product-sum operation value for the first color and the product-sum operation value for the second color on the basis of the first weighting coefficients configured corresponding to the first color and the second weighting coefficients configured corresponding to the second color in the predetermined kernel size, and the pixel values of the pixels of the first color and the pixel values of the pixels of the second color in the local area corresponding to the kernel size extracted from the mosaic image. Here, the first weighting coefficients and the second weighting coefficients are configured such that the ratio between the total sum of the first weighting coefficients and the total sum of the second weighting coefficients on the pixel lines in the first direction and the second direction in the kernel size is 1:1. That is, the ratio between the total sum of the first weighting coefficients and the total sum of the second weighting coefficients on the pixel lines in the first direction and the second direction is configured as 1:1, thus preventing the color relationship of the resultant product of the first weighting coefficient and the second weighting coefficient from deviating even if any frequency input is made in the first direction or the second direction. Accordingly, correct color information (first and second product-sum operation values) in the local area can be calculated. The image processing means calculates the pixel value of each color of the second colors at the pixel position, based on the pixel value of the first color at the pixel position of each pixel to be processed in the local area, and the product-sum operation values for the first color and each color among the second colors, and correct color information in the local area is calculated. Accordingly, a demosaic process can be accurately performed, and occurrence of color moire (false color) can be reduced.

In an image processing apparatus according to another embodiment of the present invention, the mosaic image includes at least one group of two pairs of pixels for each color of the second colors in the local area corresponding to the kernel size, the group including the first color at one pair of diagonal positions and one color among the second colors at other pair of diagonal positions in at least one of any quadrilaterals having sides parallel to the first direction and the second direction. According to such arrangement of the first and second pixels, the ratio between the total sum of the first weighting coefficients and the total sum of the second weighting coefficients on the pixel lines in the first direction and the second direction in the kernel size can be made 1:1.

In an image processing apparatus according to still another embodiment of the present invention, the mosaic image includes a basic array pattern corresponding to M×N pixels (M≥3, N≥3) in the first direction and the second direction, and the basic array pattern is repeatedly arranged in the first direction and the second direction. In the case of a mosaic image including at least three colors, the pixel size of the basic array pattern is required to be at least 3×3 pixels in order to make the ratio between the total sum of the first weighting coefficients and the total sum of the second weighting coefficients is 1:1.

In an image processing apparatus according to still another embodiment of the present invention, the mosaic image includes a pixel line including not all of the second colors, on the pixel lines in the first direction and the second direction. Even if some pixel lines among the pixel lines in the first direction and the second direction include not all the second colors, the ratio between the total sum of the first weighting coefficients and the total sum of the second weighting coefficients on the pixel lines in the first direction and the second direction in the kernel size can be made 1:1. The present invention is effective also on such a mosaic image.

An image processing apparatus according to still another embodiment of the present invention further includes control means configured to repeatedly operate the operation means and the image processing means while shifting the local area by units of object pixels to be processed with respect to the mosaic image.

Preferably, in an image processing apparatus according to still another embodiment of the present invention, the mosaic image includes G pixels corresponding to a green (G) color belonging to the first color, and R pixels and B pixels corresponding to red (R) and blue (B) colors, respectively, belonging to the second colors, when product-sum operation values of pixel values of the R, G and B pixels calculated by the operation means with respect to the individual colors are defined as Rf, Gf and Bf, respectively, and if an object pixel to be processed is the G pixel, the image processing means calculates color ratios (Rf/Gf) and (Bf/Gf) that are ratios between the product-sum operation value of the G pixels and the respective product-sum operation values of the R pixels and the B pixels, and calculates pixel values of the R and B pixels at the pixel position to be processed, based on the calculated color ratios (Rf/Gf) and (Bf/Gf) and the pixel value of the G pixel to be processed.

The ratio of product-sum operation values of R pixels and G pixels (Rf, Gf) and the ratio of product-sum operation values of B pixels and G pixels (Bf, Gf) in the local area represents the GR color ratio and the GB color ratio of original colors in the local area. Accurate estimation can be performed by interpolating the R and B pixel values at the pixel position of the G pixel to be processed on the basis of the color ratios.

Preferably, in an image processing apparatus according to still another embodiment of the present invention, the mosaic image includes G pixels corresponding to a green (G) color belonging to the first color, and R pixels and B pixels corresponding to red (R) and blue (B) colors, respectively, belonging to the second colors, when product-sum operation values of pixel values of the R, G and B pixels calculated by the operation means with respect to the individual colors are defined as Rf, Gf and Bf, respectively, and, if an object pixel to be processed is the R pixel, the image processing means calculates a color ratio (Bf/Gf) that is a ratio between the product-sum operation value of the G pixels and the product-sum operation value of the B pixels, and calculates a pixel value of a B pixel at the pixel position to be processed, based on the calculated color ratio (Bf/Gf) and a pixel value of a G pixel that is calculated for the pixel position to be processed, and if an object pixel to be processed is the B pixel, the image processing means calculates a color ratio (Rf/Gf) that is a ratio between the product-sum operation value of the G pixels and the product-sum operation value of the R pixels, and calculates a pixel value of an R pixel at the pixel position to be processed, based on the calculated color ratio (Rf/Gf) and the pixel value of the G pixel that is calculated for the pixel position to be processed.

The B pixel value on the R pixel, and the R pixel value on the B pixel are calculated, by using the G pixel value on the R pixel and G pixel value on the B pixel that have preliminarily been calculated, and interpolating the pixel values with the color ratios.

Preferably, in an image processing apparatus according to still another embodiment of the present invention, the mosaic image includes G pixels corresponding to a green (G) color belonging to the first color, and R pixels and B pixels corresponding to red (R) and blue (B) colors, respectively, belonging to the second colors, when weighted average values acquired by dividing product-sum operation values of pixel values of the R, G and B pixels calculated through the operation means by the total sum of the weighting coefficients with respect to the individual colors are defined as Rf', Gf' and Bf', respectively, and if an object pixel to be processed is the G pixel, the image processing means calculates color differences (Rf'−Gf') and (Bf'−Gf') that are differences between the weighted average value of the G pixels and the respective weighted average values of the R pixels and the B pixels, and calculates pixel values of the R and B pixels at the pixel position to be processed, based on the calculated color differences (Rf'−Gf') and (Bf'−Gf') and the pixel value of the G pixel to be processed.

The differences between the weighted average values (Rf', Gf' and Bf') for individual colors in the local area represent RGB difference (color difference) of original colors in the local area. The R and B pixel values can be accurately estimated on the basis of the color differences and the pixel value of the G pixel to be processed.

Preferably, in an image processing apparatus according to still another embodiment of the present invention, the mosaic image includes G pixels corresponding to a green (G) color belonging to the first color, and R pixels and B pixels corresponding to red (R) and blue (B) colors, respectively, belonging to the second colors, when weighted average values acquired by dividing product-sum operation values of pixel values of the R, G and B pixels calculated through the operation means with respect to the individual colors by a total sum of weighting coefficients are defined as Rf', Gf' and Bf', respectively, and if an object pixel to be processed is the R pixel, the image processing means calculates a color difference (Bf'−Gf') that is a difference between the weighted average value of the G pixels and the weighted average value of the B pixels, and calculates a pixel value of a B pixel at the pixel position to be processed, based on the calculated color difference (Bf'−Gf') and a pixel value of a G pixel that is calculated for the pixel position to be processed, and, if the object pixel to be processed is the B pixel, the image processing means calculates a color difference (Rf'−Gf') that is a difference between the weighted average value of the G pixels and the weighted average value of the R pixels, and calculates a pixel value of an R pixels at the pixel position to be processed, based on the calculated color difference (Rf'−Gf') and the pixel value of the G pixel that is calculated for the pixel position to be processed.

The B pixel value on the R pixel, and the R pixel value on the B pixel are calculated, by using the G pixel value on the R pixel and G pixel value on the B pixel that have preliminarily been calculated, and interpolating the pixel values with the color differences.

Preferably, an image processing apparatus according to still another embodiment of the present invention further includes direction determination means configured to determine a luminance correlation direction from among the first direction and the second direction and a third direction and a fourth direction, the third and fourth directions being inclined from the first and second directions, based on pixel values of pixels of the first color adjacent to the pixel to be processed in the mosaic image, wherein if the pixel at the pixel position to be processed is the R pixel or the B pixel, the image processing means calculates a pixel value of a G pixel for the pixel position using pixel values of G pixels residing in the correlation direction determined by the direction determination means.

The G pixel value on the R pixel and G pixel value on the B pixel can be accurately estimated using the pixel values of G pixels residing on the correlation direction acquired through the forgoing direction determination, and occurrence of false color in a high frequency component can be reduced.

Preferably, in an image processing apparatus according to still another embodiment of the present invention, at least one pixel of the first color in the mosaic image is arranged on each of pixel lines in the first, second, third and fourth directions. According to this arrangement, pixels of the first color necessarily reside in the luminance correlation direction even if the luminance correlation direction resides on any of the first, second, third and fourth directions. Accordingly, the G pixel value on the R pixel and the G pixel value on the B pixel can be accurately calculated using the pixel values of G pixels residing on the correlation direction.

Preferably, in an image processing apparatus according to still another embodiment of the present invention, the direction determination means acquires pixel values of pixels of the same first color adjacent in the first, second, third and fourth directions to the pixel to be processed in the mosaic image, and determines the luminance correlation direction based on difference values of pixel values of adjacent pixels of the same color.

The luminance correlation direction is determined on the basis of the difference value of the pixel values of the pixels of the same first color adjacent in each of the first, second, third and fourth directions. Accordingly, the correlation direction can be determined from among the four directions at the minimum pixel interval.

Preferably, in an image processing apparatus according to still another embodiment of the present invention, the direction determination means calculates multiple absolute difference values of pixel values of adjacent pixels of the same colors in the individual first, second, third and fourth directions, and determines, as the correlation direction, a direction with a minimum total sum or average value of the multiple absolute difference values in the respective directions. The average value of the multiple absolute difference values is calculated in each direction. Accordingly, the correlation direction can be accurately determined.

An image pickup apparatus according to still another embodiment of the present invention includes the foregoing image processing apparatus.

An image processing method according to still another embodiment of the present invention includes: an image acquisition step of acquiring a mosaic image which is acquired from an image pickup element provided with color filters according to a predetermined color filter array and corresponds to the color filter array, the color filters including first filters corresponding to at least one first color, and second filters corresponding to at least two second colors having a lower contribution ratio for acquiring a luminance signal than the first color, the color filters being placed on a plurality of pixels including photo-electric conversion elements arranged in a first direction and a second direction perpendicular to the first direction; an operation step of calculating a product-sum operation value for the first color and a product-sum operation value for each color among the second colors, based on first weighting coefficients and second weighting coefficients and on a pixel value of a pixel of the first color and a pixel value of a pixel of each color of the second colors in a local area extracted from the mosaic image and corresponding to a predetermined kernel size, the operation step performing calculation using the first weighting coefficients configured to correspond to each color among the second colors and correspond to the first color in the predetermined kernel size, and the second weighting coefficients configured to correspond to each color among the second colors, the first weighting coefficients and the second weighting coefficients being configured such that a ratio between a total sum of the first weighting coefficients and a total sum of the second weighting coefficients on pixel lines in the first direction and the second direction in the kernel size is 1:1; and an image processing step of calculating a pixel value of each color of the second colors at a pixel position of each pixel to be processed in the local area, based on the pixel value of the first color at the pixel position, and the product-sum operation values for the first color and each color among the second colors calculated by the operation step, wherein the method repeatedly operates processes by the operation step and the image processing step while shifting the local area by units of object pixels to be processed with respect to the mosaic image.

An image processing program according to still another embodiment of the present invention causes a computer to execute: an image acquisition function of acquiring a mosaic image which is acquired from an image pickup element provided with color filters according to a predetermined color filter array and corresponds to the color filter array, the color filters including first filters corresponding to at least one first color, and second filters corresponding to at least two second colors having a lower contribution ratio for acquiring a luminance signal than the first color, the color filters being placed on a plurality of pixels including photo-electric conversion elements arranged in a first direction and a second direction perpendicular to the first direction; an operation function of calculating a product-sum operation value for the first color and a product-sum operation value for each color among the second colors, based on first weighting coefficients and second weighting coefficients and on a pixel value of a pixel of the first color and a pixel value of a pixel of each color of the second colors in a local area extracted from the mosaic image and corresponding to a predetermined kernel size, the operation function performing calculation using the first weighting coefficients configured to correspond to each color among the second colors and correspond to the first color in the predetermined kernel size, and the second weighting coefficients configured to correspond to each color among the second colors, the first weighting coefficients and the second weighting coefficients being configured such that a ratio between a total sum of the first weighting coefficients and a total sum of the second weighting coefficients on pixel lines in the first direction and the second direction in the kernel size is 1:1; and an image processing function of calculating a pixel value of each color of the second colors at a pixel position of each pixel to be processed in the local area, based on the pixel value of the first color at the pixel position to be processed, and the product-sum operation values for the first color and each color among the second colors calculated by the operation function.

According to the present invention, the color information (the product-sum operation value of the first color pixels and the product-sum operation value of the second color pixels) in the local area in the mosaic image can be accurately calculated without high frequency adverse effects. This calculation can accurately perform the demosaic process, and reduce occurrence of color moire (false color).

BRIEF DESCRIPTION OF THE DRAWINGS

FIG. 5A is a first embodiment of a weighted average filter applied to the image pickup element of the first embodiment;

FIG. 5B is the first embodiment of a weighted average filter applied to the image pickup element of the first embodiment;

FIG. 6 is a diagram used for illustrating a determination direction of a luminance correlation direction;

FIG. 7A is an embodiment of another weighted average filter applied to the image pickup element of the first embodiment;

FIG. 7B is an embodiment of another weighted average filter applied to the image pickup element of the first embodiment;

FIG. 8 is a second embodiment of a weighted average filter applied to the image pickup element of the first embodiment;

FIG. 11A is a diagram illustrating a second embodiment of an image pickup element and a weighted average filter of a third embodiment applied thereto;

FIG. 11B is a diagram illustrating the second embodiment of the image pickup element and the weighted average filter of the third embodiment applied thereto;

FIG. 12A is a diagram illustrating a third embodiment of an image pickup element and a weighted average filter of a fourth embodiment applied thereto;

FIG. 12B is a diagram illustrating the third embodiment of the image pickup element and the weighted average filter of the fourth embodiment applied thereto;

FIG. 15A is a diagram illustrating an embodiment of a weighted average filter used for a demosaic process for a mosaic image acquired from the image pickup element of the fourth embodiment illustrated in FIG. 13;

FIG. 15B is a diagram illustrating the embodiment of the weighted average filter used for the demosaic process for the mosaic image acquired from the image pickup element of the fourth embodiment illustrated in FIG. 13;

FIG. 17A is a diagram illustrating an embodiment of a weighted average filter used for a demosaic process for a mosaic image acquired from the image pickup element of the fifth embodiment illustrated in FIG. 16;

FIG. 17B is a diagram illustrating the embodiment of the weighted average filter used for the demosaic process for the mosaic image acquired from the image pickup element of the fifth embodiment illustrated in FIG. 16;

DETAILED DESCRIPTION OF EXEMPLARY EMBODIMENTS

Hereinafter, embodiments of an image processing apparatus, a method, a program and a recording medium, and an image pickup apparatus according to the present invention are described in detail with reference to the accompanying drawings.

[Image Pickup Apparatus]

Figure 1:
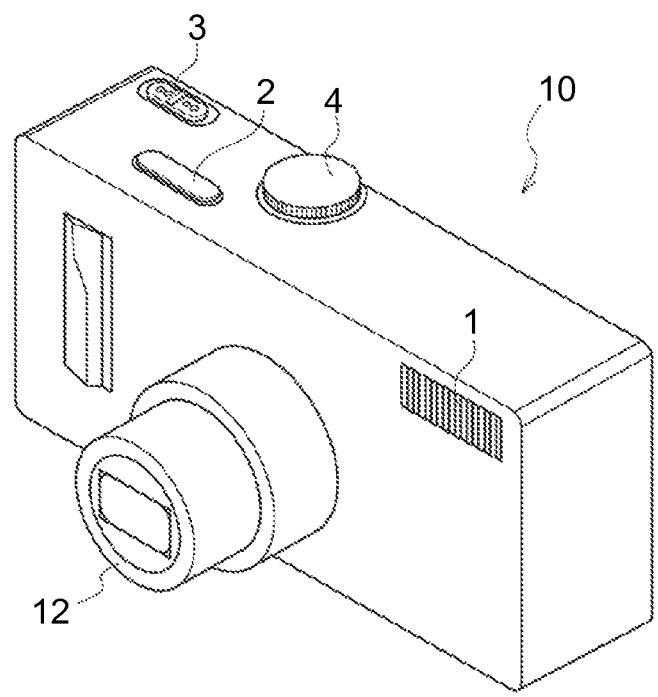
FIG. 1 is a perspective view illustrating an embodiment of an image pickup apparatus according to the present invention.
Figure 2:
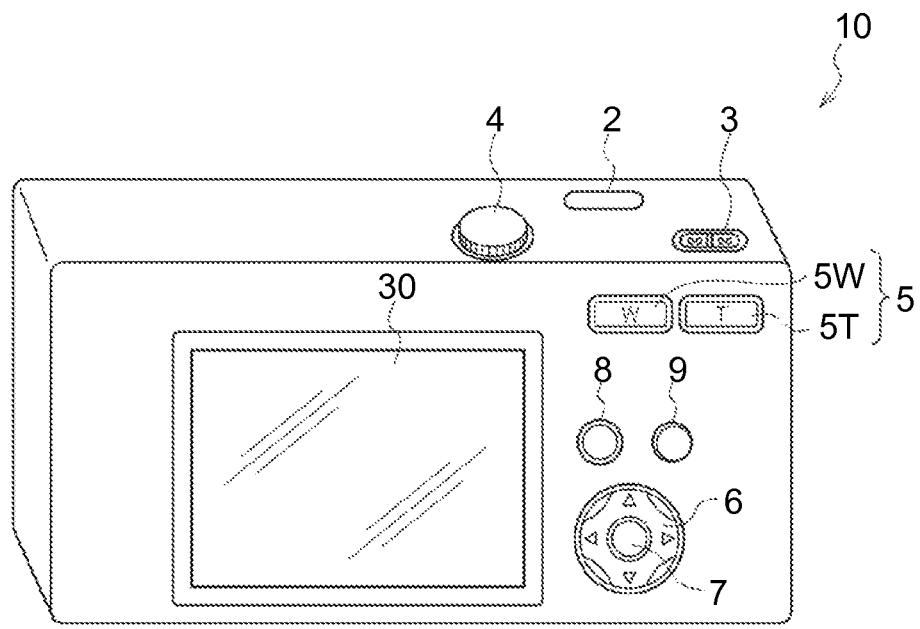
FIG. 2 is a rear view of the image pickup apparatus illustrated in FIG. 1.

FIG. 1 and FIG. 2 are a perspective view and a rear view, respectively, illustrating an embodiment of an image pickup apparatus according to the present invention. This image pickup apparatus 10 is a digital camera that causes an image pickup element to receive light having passed through a lens, converts the light into a digital signal, and records the signal into a recording medium.

As illustrated in FIG. 1, the image pickup apparatus 10 includes an imaging lens (imaging optical system) 12, an flash light unit 1 and the like on the front surface, and further includes a shutter release button 2, a power/mode switch 3, a mode dial 4 and the like on the top surface. Meanwhile, as illustrated in FIG. 2, a liquid crystal monitor 30 for 3D display, a zoom button 5, a cross button 6, a MENU/OK button 7, a playback button 8, a BACK button 9 and the like are arranged on the rear surface of the camera.

The imaging lens 12 includes a collapsible zoom lens. The imaging lens 12 telescopes out of a camera main body by setting a mode of the camera to an imaging mode through the power/mode switch 3. The flash light unit 1 illuminates a main subject with flash light.

The shutter release button 2 includes a two-step stroke switch that includes what are called "halfway pressed" and "fully pressed" states. The image pickup apparatus 10 operates automatic exposure adjustment (AE)/automatic focusing (AF) by a "halfway pressed" operation of the shutter release button 2 during being driven in the imaging mode, and takes an image by a "fully pressed" operation of the button. During being driven in the imaging mode, the image pickup apparatus 10 takes an image by the shutter release button 2 being "fully pressed".

The release switch is not limited to the mode of the two-step stroke switch including halfway pressed and fully pressed states. Alternatively, each single operation may output an S1 ON signal or an S2 ON signal. Respective switches may be provided for outputting the S1 ON signal and S2 ON signal.

In a mode of issuing an operation instruction through a touch panel or the like, the operation instruction may be output by touching an area that corresponds to the operation instruction displayed on the touch panel, and serve as such operation means. In the present invention, the mode of the operation means is not limited thereto. Any mode of operation means that instructs an imaging preparation process or an imaging process may be adopted. Operation instructions onto a single piece of operation means may sequentially perform the imaging preparation process and the imaging process.

The power/mode switch 3 has both of a function as a power switch of turning on and off the power of the image pickup apparatus 10 and a function as a mode switch of setting the mode of the image pickup apparatus 10. The power/mode switch 3 is arranged slidably among an "OFF position", a "play back position" and an "imaging position". The power of the image pickup apparatus 10 is turned on by sliding the power/mode switch 3 to adjust the position to the "play back position" or the "imaging position". The power of the image pickup apparatus 10 is turned off by adjusting the position to the "OFF position". The mode is set to the "playback mode" by sliding the power/mode switch 3 to adjust the position to the "playback position". The mode is set to the "imaging mode" by adjusting the position to the "imaging position".

The mode dial 4 functions as imaging mode setting means for setting the imaging mode of the image pickup apparatus 10. According to the setting position of the mode dial, the imaging mode of the image pickup apparatus 10 is set to various modes. For instance, the imaging modes are a "still image taking mode" for taking a still image, a "moving image taking mode" for taking a moving image and the like.

The liquid crystal monitor 30 displays a live view image (through image) in the imaging mode, displays a still image or a moving image in the playback mode. The liquid crystal monitor 30 displays a menu screen and the like, thereby functioning as a part of a graphical user interface (GUI).

The zoom button 5 functions as zoom instruction means for instructing zooming, and includes a tele button 5T for instructing zooming to a telescopic side and a wide button 5W for instructing zooming to the wide angle side. In the imaging mode, the image pickup apparatus 10 changes the focal length of the imaging lens 12 according to operations on the tele button 5T and the wide button 5W. In the playback mode, operations on the tele button 5T and the wide button 5W enlarge and reduce an image being played back.

The cross button 6 is an operation unit for receiving instructions in four directions, which are vertical and horizontal directions. The cross button 6 functions as a button (cursor movement operation means) for selection of an item from a menu screen, and instructions of selecting various setting items from each menu. A left/right key functions as a frame feeding (forward direction/reverse direction feeding) button in the playback mode.

The MENU/OK button 7 is an operation key that has both a function as a menu button for issuing an instruction for displaying a menu on a screen of the liquid crystal monitor 30 and a function as an OK button for issuing an instruction for determining and executing selection contents.

The playback button 8 is a button for switching the mode to the playback mode for displaying, on the liquid crystal monitor 30, a still image or a moving image which has been taken and recorded.

The BACK button 9 functions as a button for designating cancellation of an input operation and reversal to the previous operation state.

[Internal Configuration of Image Pickup Apparatus]

Figure 3:
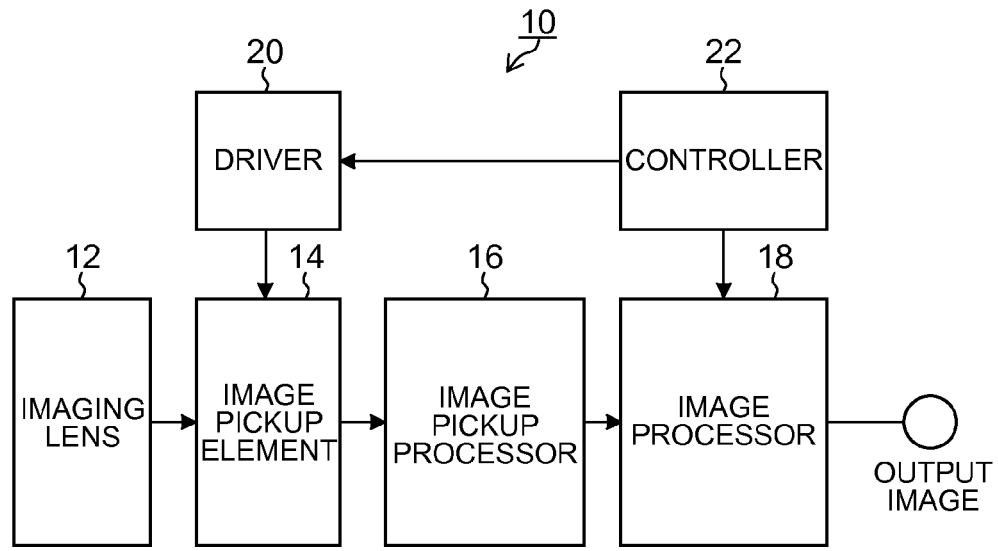
FIG. 3 is a block diagram illustrating an embodiment of an internal configuration of the image pickup apparatus illustrated in FIG. 1.

FIG. 3 is a block diagram illustrating an embodiment of an internal configuration of the image pickup apparatus 10.

Through the imaging lens 12, an image of a subject is taken, an optical image representing a subject image is formed on a light receiving surface of an image pickup element 14 (an image pickup element of a first embodiment).

This image pickup element 14 is a single-element color image pickup element that includes multiple pixels (not illustrated) that includes photo-electric conversion elements two-dimensionally arranged in a horizontal direction (first direction) and a vertical direction (second direction), and color filters that have a predetermined color filter array arranged on the light receiving surfaces of the respective pixels. The color filter array of the image pickup element 14 is described later in detail.

The subject image formed on the image pickup element 14 is converted by the photo-electric conversion element into signal charges according to the amounts of incident light. The signal charges accumulated in the respective photo-electric conversion elements are sequentially read as voltage signals (image signal) according to the signal charges from the image pickup element 14 on the basis of drive pulses supplied from a driver 20 according to an instruction from a controller 22. The image signals read from the image pickup element 14 are R, G and B signals representing an RGB mosaic image corresponding to the color filter array of the image pickup element 14. The image pickup element 14 is not limited to a CCD (Charge Coupled Device) image sensor. Alternatively, this element may be another type of image sensor, such as a CMOS (Complementary Metal Oxide Semiconductor) or XY address type sensor.

The image signal read from the image pickup element 14 is input into an image pickup processor 16. The image pickup processor 16 includes a correlated double sampling circuit (CDS) for removing reset noise included in the image signal, an AGC (Automatic Gain Control) circuit for amplifying the image signal to control a certain magnitude level, and an A/D converter. The image pickup processor 16 applies a correlated double sampling process to the input image signal while amplifying this image, and subsequently outputs RAW data, which is the converted digital image signal, to an image processor 18.

The image processor 18 includes a white balance correction circuit, a gamma correction circuit, a demosaic process circuit (process circuit of calculating color information on all the R, G and B at each pixel position from the RGB mosaic image according to the color filter array of the single-element image pickup element 14), a luminance and color difference signal generation circuit, a contour correction circuit, and a color correction circuit. The image processor 18 applies required signal processing to the RAW data on the mosaic image input from the image pickup processor 16 according to the instruction from a controller 22, generates an RGB pixel signal including the entire RGB color information on each pixel, and further generates image data (YUV data) including luminance data (Y data) and color difference data (Cr and Cb data) on the basis of the signal.

As to the image data generated in the image processor 18, a compression/expansion process circuit applies a compression process in conformity with JPEG (Joint Photographic Experts Group) standards to a still image, and applies a compression image in conformity with MPEG2 (Moving Picture Experts Group) standards to a moving image. The image data subjected to the compression process is recorded in a recording medium (memory card), or output to a liquid crystal monitor 30 (FIG. 2) and displayed thereon.

<First Embodiment of Image Pickup Element>

Figure 4:
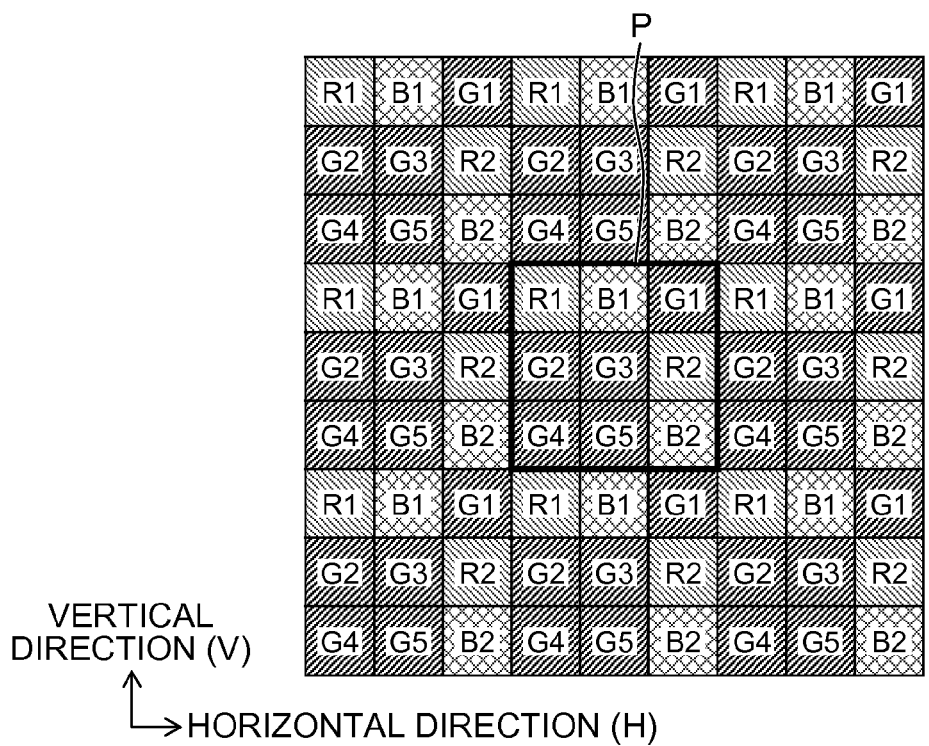
FIG. 4 is a diagram illustrating a color filter array of color filters provided in an image pickup element in a first embodiment.

FIG. 4 is a diagram illustrating a first embodiment of the image pickup element 14 and, in particular, illustrates a color filter array arranged on the light receiving surface of the image pickup element 14.

The color filter array of the image pickup element 14 includes a basic array pattern P (pattern indicated by a thick frame) corresponding to M×N (3×3) pixels. In the color filter array, the basic pattern P is repetitively arranged in the horizontal direction (H) and the vertical direction (V). That is, in this color filter array, filters (R filters, G filters and B filters) of a first color (green (G)) and at least two colors (red (R) and blue (B)) are arranged according to a predetermined cycle. Since the R filters, G filters and B filters are thus arranged according to the predetermined cycle, image processing of RGB RAW data (mosaic image) read from the image pickup element 14, or the like can be performed according to the repetitive pattern.

As illustrated in FIG. 4, the numbers of pixels of R pixels, G pixels and B pixels corresponding to the R filters, G filters and B filters in the 3×3-pixel basic array pattern P are 2 pixels, 5 pixels and 2 pixels, respectively. The assigned number of G pixels is more than each of the assigned numbers of R pixels and B pixels. That is, in comparison with the R pixels and the B pixels, the ratio of the number of G pixels having a high contribution ratio for acquiring a luminance signal is higher than each of the ratios of the numbers of pixels of R pixels and B pixels.

In the color filter array (mosaic image) of the first embodiment illustrated in FIG. 4, pixel lines in the horizontal direction and the vertical direction include pixel lines including all the R, G and B pixels, and pixel lines including not all the R, G and B pixels (pixel lines including only G and R pixels, and pixel lines including only G and B pixels) in a mixed manner.

<First Embodiment of Weighted Average Filter>

A weighted average filter used in the demosaic process circuit of the image processor 18 (operation means and image processing means) is now described.

FIGS. 5A and 5B are diagrams each illustrating a weighted average filter of a first embodiment, and relate to weighting coefficients of the weighted average filter designed for pixels to be subjected to the demosaic process (pixel G3 illustrated in FIG. 4).

The weighted average filters illustrated in FIGS. 5A and 5B have the same kernel size as the size of the basic array pattern P. FIG. 5A illustrates a weighted average filter for calculating the color ratio between G and R in a kernel corresponding to a local area. FIG. 5B illustrates a weighted average filter for calculating the color ratio between G and B in the kernel corresponding to the local area. The weighting coefficients of the weighted average filter of the first embodiment are "1" and "0".

In the weighted average filter illustrated in FIG. 5A, the weighting coefficients are configured such that the ratio between the weighting coefficients (total sum) for G pixels and the weighting coefficients (total sum) for R pixels on the pixel lines in the horizontal direction in the kernel is 1:1, and the ratio between the weighting coefficients (total sum) for G pixels and the weighting coefficients (total sum) for R pixels on the pixel lines in the vertical direction in the kernel is 1:1.

Likewise, in the weighted average filter illustrated in FIG. 5B, the weighting coefficients are configured such that the ratio between the weighting coefficients (total sum) for G pixels and the weighting coefficients (total sum) for B pixels on the pixel lines in the horizontal direction in the kernel is 1:1, and the ratio between the weighting coefficients (total sum) for G pixels and the weighting coefficients (total sum) for B pixels on the pixel lines in the vertical direction in the kernel is 1:1.

[Demosaic Process]

Next, a method of applying the demosaic process to an RGB demosaic image by the demosaic process circuit of the image processor 18 is described.

As illustrated in FIG. 4, the demosaic process circuit extracts a 3×3-pixel local area (corresponding to the size of the basic array pattern P in this example) from the mosaic image acquired from the image pickup element 14 (FIG. 4 illustrates not only the color filter array but also the mosaic image read and acquired from the image pickup element). The demosaic process circuit calculates a product-sum operation value for each color of G and R colors on the basis of the pixel value of each pixel in the local area and the weighting coefficients of the weighted average filter illustrated in FIG. 5A. That is, the product-sum operation value for each color is acquired by multiplying together the pixel value of each pixel in the local area and the weighting coefficient of the weighted average filter at the corresponding pixel position, and multiplied results are accumulated for each color of G and R colors. Likewise, a product-sum operation value for each color of G and R colors is calculated on the basis of the pixel value of each pixel in the local area and the weighting coefficients of the weighted average filter illustrated in FIG. 5B.

Next, the ratio (color ratio) of the product-sum operation value of each color of G and R colors from each weighted average value of G and R colors calculated as described above, and the product-sum operation value of each color of G and B colors from each weighted average value of G and B colors.

The pixel at the center of the 3×3-pixel local area (pixel G3 at the center of the thick frame illustrated in FIG. 4) is then adopted as a pixel to be subjected to the demosaic process, and the R and B pixel values at the pixel position of the pixel G3 to be processed is calculated on the basis of the calculated color ratio and the pixel value of the pixel G3.

More specifically, the product-sum operation values for the respective calculated RGB colors are defined as Rf, Gf and Bf. The pixel value of the pixel G3 to be subjected to the demosaic process is defined as G. In this case, the pixel values of R and B for R and B colors at the pixel position to be processed are calculated by the following expressions.

$$R = G \times (Rf/Gf) \quad (1)$$

$$B = G \times (Bf/Gf) \quad (2)$$

In the weighted average filter illustrated in FIGS. 5A and 5B, the weighting coefficients are configured such that the ratio between the weighting coefficients (total sum) for G pixels and the weighting coefficients (total sum) for R pixels on the pixel lines in the horizontal direction in the kernel is 1:1, and the ratio between the weighting coefficients (total sum) for G pixels and the weighting coefficients (total sum) for R pixels on the pixel lines in the vertical direction in the kernel is 1:1. Accordingly, even if high frequency input is made into in the horizontal direction or the vertical direction, the demosaic process circuit can calculate correct color ratios in the local area without deviation of relationship between color ratios ((Rf/Gf), (Bf/Gf)) of these results multiplied by the weighting coefficients. As a result, the demosaic process can be accurately performed on the basis of the calculated color ratios.

Next, the demosaic process in the case of shifting the local area extracted from the mosaic image by one pixel in the horizontal direction is described.

FIG. 6 illustrates the case of shifting the local area (indicated by the thick frame) illustrated in FIG. 4 by one pixel in the horizontal direction (right side). In this case, the pixel (the center pixel in the local area) to be subjected to the demosaic process is a pixel R2 at the center of the thick frame illustrated in FIG. 6, and the demosaic process circuit calculates the G and B pixel values at the pixel position of the pixel R2.

<Method of Calculating G Pixel Values>

As illustrated in FIG. 6, G pixels among 2×2 pixels adjacent to the pixel R2 at the center in the local area indicated by the thick frame are taken and the pixel values of the G pixels are defined as G2, G3, G4 and G5. In this case, direction determination means included in the demosaic process circuit calculates absolute difference values in respective directions.

That is, the absolute difference value in the horizontal direction is (|G2−G3|+|G4−G5|)/2, the absolute difference value in the vertical direction is (|G2−G4|+|G3−G5|)/2, the absolute difference value in the upper right direction is |G3−G4|, and the absolute difference value in lower right direction is |G2−G5|.

The direction determination means determines that the correlation (correlation direction) of the G pixel is in a direction with the minimum absolute difference value among these four absolute difference values.

Since the correlation direction is determined on the basis of the G pixels among 2×2 pixels adjacent to each other as described above, the correlation direction can be determined at the minimum pixel interval. That is, the correlation direction can be accurately determined without high frequency adverse effects.

After the correlation direction at the pixel to be subjected to the demosaic process is determined, the demosaic process circuit uses the pixel values of G pixels residing in the determined correlation direction when calculating the pixel value of another color (G in this case) at the pixel position to be subjected to the demosaic process.

As illustrated in FIG. 6, G pixels reside on all the pixel lines in the horizontal direction (first direction), the vertical direction (second direction), the diagonally upper right direction (third direction), and the diagonally lower right direction (fourth direction). Accordingly, the demosaic process circuit adopts the pixel value of one G pixel residing adjacent to the pixel to be processed, or an interpolated value of the pixel values of G pixels, as the pixel value of the G pixel at the pixel position to be processed.

Meanwhile, the B pixel value at the pixel position of the pixel R2 is calculated on the basis of the G pixel value at the pixel position of the pixel R2 having been calculated as described above and the color ratio (Bf/Gf) in the local area.

As illustrated in FIG. 7A, the color ratio (Bf/Gf) in the 3×3-pixel local area is calculated using a weighted average filter illustrated in FIG. 7B. In this weighted average filter, as with the weighted average filters illustrated in FIGS. 5A and 5B, the weighting coefficients are configured such that the ratio between the weighting coefficients (total sum) for G pixels and the weighting coefficients (total sum) for B pixels on the pixel lines in the horizontal direction in the kernel is 1:1, and the ratio between the weighting coefficients (total sum) for G pixels and the weighting coefficients (total sum) for B pixels on the pixel lines in the vertical direction in the kernel is 1:1.

Here, the product-sum operation values of the pixel values of the G and B pixels with respect to the individual colors in the local area are defined as Gf and Bf, respectively, and the G pixel value calculated for the pixel position of the pixel R2 is defined as G'. The B pixel value B at the pixel position of the pixel R2 is calculated by the following expression.

$$B = G' \times (Bf/Gf) \quad (3)$$

In the case where the pixel to be processed is a B pixel and the G and R pixel values at the pixel position are calculated, the process is performed as described above. That is, the G pixel value is calculated on the basis of the G pixel values in the correlation direction determined by the direction determination means. The R pixel value is calculated on the basis of the calculated G pixel values and the color ratio (Rf/Gf) in the local area. The color ratio (Rf/Gf) is calculated through the weighted average filter having the weighting coefficients configured such that the ratio between the weighting coefficients (total sum) for G pixels and the weighting coefficients (total sum) for R pixels on the pixel lines in the horizontal direction in the kernel is 1:1, and the ratio between the weighting coefficients (total sum) for G pixels and the weighting coefficients (total sum) for R pixels on the pixel lines in the vertical direction in the kernel is 1:1.

Here, the product-sum operation values of the pixel values of the G and R pixels with respect to the individual colors in the local area are defined as Gf and Rf, respectively, and the G pixel value calculated for the pixel position of the pixel B (B1 or B2) is defined as G'. The R pixel value R at the pixel position of the pixel B is calculated by the following expression.

$$R = G' \times (Rf/Gf) \quad (4)$$

As described above, the demosaic process is sequentially performed while the local area is shifted by one pixel each time with respect to the mosaic image.

As illustrated in FIG. 4, the basic array pattern P of the mosaic image in this embodiment includes nine pixels, i.e., five G pixels (G1 to G5), two R pixels (R1 and R2) and two B pixels (B1 and B2), which have different positional relationships with surrounding colors. Accordingly, a different weighted average filter for calculating the color ratios ((Rf/Gf) (Bf/Gf)) is prepared for each pixel of the five G pixels. Furthermore, a different weighted average filter for calculating the color ratio (Bf/Gf) for each pixel of the two R pixels, and another different weighted average filter for calculating the color ratio (Rf/Gf) is prepared for each pixel of the two B pixels.

The demosaic process circuit selects the weighted average filter to be used for calculating the color ratio according to the pixel to be processed among the nine pixels in the basic array pattern, and calculates the R and B pixel values at the pixel position to be processed using the selected weighted average filter according to the foregoing expressions (1) to (4).

<Second Embodiment of Weighted Average Filter>

An (a) portion of FIG. 8 and a (b) portion of FIG. 8 are diagrams each illustrating a weighted average filter of a second embodiment, and relate to weighting coefficients of the weighted average filter designed for pixels to be subjected to the demosaic process (pixel G3 illustrated in FIG. 4).

The weighted average filters illustrated in the (a) portion and the (b) portion of FIG. 8 have a 5×5-pixel kernel size larger than the size of the 3×3-pixel basic array pattern P. The (a) portion of FIG. 8 illustrates a weighted average filter for calculating the color ratio between G and R in a kernel corresponding to a 5×5-pixel local area. The (b) portion of FIG. 8 illustrates a weighted average filter for calculating the color ratio between G and B in a kernel corresponding to a 5×5-pixel local area.

In the weighted average filter illustrated in the (a) portion of FIG. 8, the weighting coefficients are configured such that the ratio between the total sum of the weighting coefficients for G pixels and the total sum of the weighting coefficients for R pixels on the pixel lines in the horizontal direction in the kernel is 1:1, and the ratio between the total sum of the weighting coefficients for G pixels and the total sum of the weighting coefficients for R pixels on the pixel lines in the vertical direction in the kernel is 1:1.

Likewise, in the weighted average filter illustrated in the (b) portion of FIG. 8, the weighting coefficients are configured such that the ratio between the total sum of the weighting coefficients for G pixels and the total sum of the weighting coefficients for B pixels on the pixel lines in the horizontal direction in the kernel is 1:1, and the ratio between the total sum of the weighting coefficients for G pixels and the total sum of the weighting coefficients for B pixels on the pixel lines in the vertical direction in the kernel is 1:1.

Each of the total sums of the weighting coefficients for G pixels and R pixels of the weighted average filter illustrated in the (a) portion of FIG. 8 is ten. When a high-frequency vertical stripe image illustrated in a (c) portion of FIG. 8 is taken, each of the total sums of weighting coefficients for G pixels and R pixels in white portions contributing to the product-sum operation is three. When a high-frequency horizontal stripe image illustrated in a (d) portion of FIG. 8 is taken, each of the total sums of weighting coefficients for G pixels and R pixels in white portions contributing to the product-sum operation is seven.

That is, even if high frequency input is made into in the horizontal direction or the vertical direction, correct color ratios in the local area can be calculated without deviation of relationship between color ratios ((Rf/Gf), (Bf/Gf)) of these results multiplied by the weighting coefficients.

<Method of Determining Weighting Coefficient>

In the cases where any quadrilaterals having edges parallel in the horizontal direction and the vertical direction are set in the local area corresponding to the 3×3-pixel kernel size illustrated in FIGS. 5A and 5B, the quadrilaterals are searched for a quadrilateral which has a group of two pairs of pixels in which one pair of diagonal corners have G pixels and the other pair of diagonal corners have the R pixels of the same color or the B pixels of the same color.

Figure 9A:
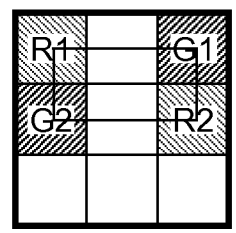
FIG. 9A is a diagram used for illustrating a method of determining weighting coefficients of the weighted average filters of the first embodiment illustrated in FIGS. 5A and 5B.
Figure 9B:
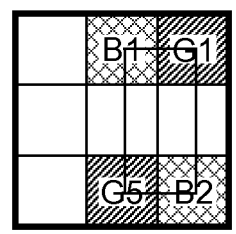
FIG. 9B is a diagram used for illustrating the method of determining weighting coefficients of the weighted average filters of the first embodiment illustrated in FIGS. 5A and 5B.

FIG. 9A illustrates a quadrilateral that has pixels G1 and G2 at one pair of diagonal positions of the quadrilateral and pixels R1 and R2 at the other pair of diagonal positions. FIG. 9B illustrates a quadrilateral that has pixels G1 and G5 at one pair of diagonal positions of the quadrilateral and pixels B1 and B2 at the other pair of diagonal positions.

A weighting coefficient having the identical value is assigned as weighting coefficients at the two pairs of diagonal positions of each of these quadrilaterals. As to the weighting coefficients illustrated in FIGS. 5A and 5B, each of the two pairs of diagonal positions of the quadrilateral is assigned "1", and each of the other positions in the kernel is assigned "0".

The kernel requires at least one quadrilateral that has G pixels at one pair of diagonal corners and R pixels at the other pair of diagonal corners, and at least one quadrilateral that has G pixels at one pair of diagonal corners and B pixels at the other pair of diagonal corners. The weighted average filter can thus be configured to have weighting coefficients where the ratio of total sums of weighting coefficients for G pixels and R pixels on pixel lines in the horizontal direction and the vertical direction to which the weighting coefficients (other than "0") are assigned is 1:1. Furthermore, the weighted average filter can be configured to have weighting coefficients where the ratio of total sums of weighting coefficients for G pixels and B pixels on the pixel lines in the horizontal direction and the vertical direction is 1:1.

The kernel requires at least one quadrilateral that has G pixels at one pair of diagonal corners and R pixels at the other pair of diagonal corners, and at least one quadrilateral that has G pixels at one pair of diagonal corners and B pixels at the other pair of diagonal corners. Accordingly, the pixel size of the basic array pattern of the mosaic image is required to be at least 3×3 pixels.

The weighting coefficients of the weighted average filter illustrated in the (a) portion of FIG. 8 can be acquired as follows using the foregoing quadrilaterals.

Figure 10:
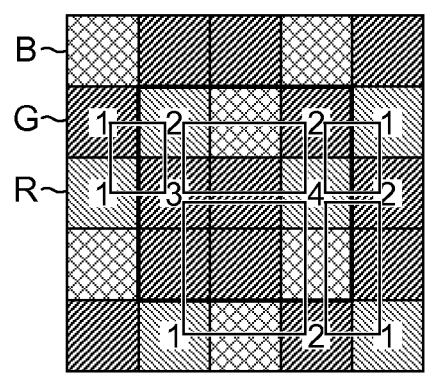
FIG. 10 is a diagram used for illustrating a method of determining weighting coefficients of the weighted average filter of the second embodiment illustrated in FIG. 8.

As illustrated in FIG. 10, a 5×5-kernel is searched for at least one quadrilateral that has G pixels at one pair of diagonal corners and R pixels at the other pair of diagonal corners. In the example illustrated in FIG. 10, five quadrilaterals are adopted. The positions of diagonal corners of the five quadrilaterals are assigned a weighting coefficient of "1". The other positions are assigned a weighting coefficient of "0". Positions where diagonal corners overlap with each other are assigned the overlapping numbers (1×overlapping number).

Such definition of the weighting coefficients in the weighted average filter can achieve the weighting coefficients where the ratio of total sums of weighting coefficients for G pixels and R pixels on the pixel lines in the horizontal direction and the vertical direction to which the weighting coefficients (other than "0") are assigned is 1:1. Furthermore, such definition can achieve the weighting coefficients where the ratio of total sums of weighting coefficients for G pixels and B pixels on the pixel lines in the horizontal direction and the vertical direction is 1:1.

<Second Embodiment of Image Pickup Element and Weighted Average Filter of Third Embodiment>

Figures 11A, 11B, 12A, 12B:
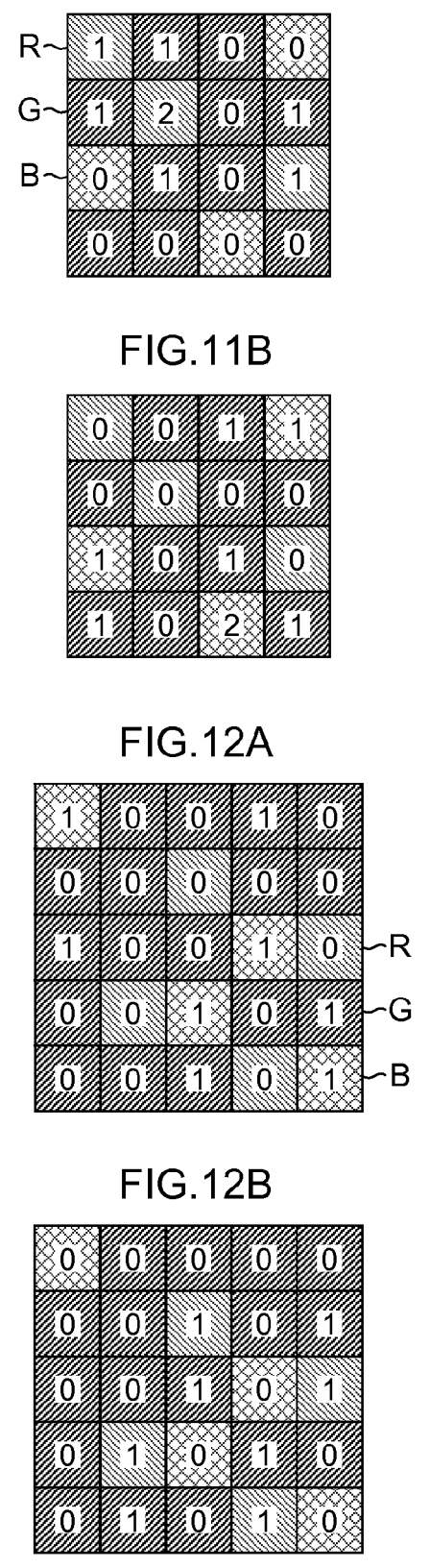

FIGS. 11A and 11B are diagrams illustrating a second embodiment of the image pickup element 14 and a weighted average filter of a third embodiment applied thereto.

The color filter array of the image pickup element of the second embodiment includes a basic array pattern corresponding to M×N (4×4) pixels. This basic array pattern P is arranged repeatedly in the horizontal direction (H) and the vertical direction (V).

As illustrated in FIGS. 11A and 11B, the numbers of pixels of R pixels, G pixels and B pixels corresponding to the R filters, G filters and B filters in the 4×4-pixel basic array pattern are 3 pixels, 10 pixels and 3 pixels, respectively. The assigned number of G pixels is more than each of the assigned numbers of R pixels and B pixels. That is, in comparison with the R pixels and the B pixels, the ratio of the number of G pixels having a high contribution ratio for acquiring a luminance signal is higher than each of the ratios of the numbers of pixels of R pixels and B pixels.

In the color filter array (mosaic image) of the second embodiment, pixel lines in the horizontal direction and the vertical direction include pixel lines including all the R, G and B pixels, and pixel lines including not all the R, G and B pixels (pixel lines including only G and R pixels, and pixel lines including only G and B pixels) in a mixed manner.

The weighted average filters of the third embodiment illustrated in FIGS. 11A and 11B have the same kernel size as the size of a 4×4-pixel basic array pattern. FIG. 11A illustrates a weighted average filter for calculating the color ratio between G and R in a kernel corresponding to a local area. FIG. 11B illustrates a weighted average filter for calculating the color ratio between G and B in the kernel corresponding to the local area.

The weighting coefficients in the weighted average filter illustrated in FIG. 11A are configured such that the ratio between the total sum of the weighting coefficients for G pixels and the total sum of the weighting coefficients for R pixels on the pixel lines in the horizontal direction in the kernel is 1:1, and the ratio between the total sum of the weighting coefficients for G pixels and the total sum of the weighting coefficients for R pixels on the pixel lines in the vertical direction in the kernel is 1:1.

Likewise, in the weighted average filter illustrated in the FIG. 11B, the weighting coefficients are configured such that the ratio between the total sum of the weighting coefficients for G pixels and the total sum of the weighting coefficients for B pixels on the pixel lines in the horizontal direction in the kernel is 1:1, and the ratio between the total sum of the weighting coefficients for G pixels and the total sum of the weighting coefficients for B pixels on the pixel lines in the vertical direction in the kernel is 1:1.

Use of the weighted average filter allows the color ratio ((Rf/Gf), (Bf/Gf)) in the local area to be accurately calculated without high frequency adverse effects.

As illustrated in FIGS. 11A and 11B, G pixels reside on all the pixel lines in the horizontal direction the vertical direction, the diagonally upper right direction, and diagonally lower right direction. Accordingly, the demosaic process circuit can adopt the pixel value of one G pixel residing adjacent in the correlation direction to the pixel to be processed, or an interpolated value of the pixel values of G pixels, as the pixel value of the G pixel at the pixel position to be processed. The mosaic images illustrated in FIGS. 11A and 11B do not include G pixels of 2×2 pixels, which are illustrated in FIG. 6, but includes G pixels adjacent in the horizontal direction, the vertical direction, the diagonally upper right direction and the diagonally lower right direction in the basic array pattern. Accordingly, the direction determination means can determine the correlation direction at the minimum pixel interval on the basis of these G pixels.

<Third Embodiment of Image Pickup Element and Weighted Average Filter>

FIGS. 12A and 12B are diagrams illustrating a third embodiment of the image pickup element 14 and a weighted average filter of a fourth embodiment applied thereto.

The color filter array of the image pickup element of the third embodiment includes a basic array pattern corresponding to M×N (5×5) pixels. In the color filter array, the basic pattern P is repetitively arranged in the horizontal direction (H) and the vertical direction (V).

As illustrated in FIGS. 12A and 12B, the numbers of pixels of R pixels, G pixels and B pixels corresponding to the R filters, G filters and B filters in the 5×5-pixel basic array pattern are 4 pixels, 17 pixels and 4 pixels, respectively. The assigned number of G pixels is more than each of the assigned numbers of R pixels and B pixels. That is, in comparison with the R pixels and the B pixels, the ratio of the number of G pixels having a high contribution ratio for acquiring a luminance signal is higher than each of the ratios of the numbers of pixels of R pixels and B pixels.

In the color filter array (mosaic image) of the third embodiment, pixel lines in the horizontal direction and the vertical direction include pixel lines including all the R, G and B pixels, and pixel lines including not all the R, G and B pixels (pixel lines including only G and R pixels, and pixel lines including only G and B pixels) in a mixed manner.

The weighted average filters of the fourth embodiment illustrated in FIGS. 12A and 12B have the same kernel size as the size of a 5×5-pixel basic array pattern. FIG. 12A illustrates a weighted average filter for calculating the color ratio between G and R in a kernel corresponding to a local area. FIG. 12B illustrates a weighted average filter for calculating the color ratio between G and B in the kernel corresponding to the local area.

The weighting coefficients in the weighted average filter illustrated in FIG. 12A are configured such that the ratio between the total sum of the weighting coefficients for G pixels and the total sum of the weighting coefficients for R pixels on the pixel lines in the horizontal direction in the kernel is 1:1, and the ratio between the total sum of the weighting coefficients for G pixels and the total sum of the weighting coefficients for R pixels on the pixel lines in the vertical direction in the kernel is 1:1.

Likewise, in the weighted average filter illustrated in the FIG. 12B, the weighting coefficients are configured such that the ratio between the total sum of the weighting coefficients for G pixels and the total sum of the weighting coefficients for B pixels on the pixel lines in the horizontal direction in the kernel is 1:1, and the ratio between the total sum of the weighting coefficients for G pixels and the total sum of the weighting coefficients for B pixels on the pixel lines in the vertical direction in the kernel is 1:1.

Use of the weighted average filter allows the color ratio ((Rf/Gf), (Bf/Gf)) in the local area to be accurately calculated without high frequency adverse effects.

As illustrated in FIGS. 12A and 12B, G pixels reside on all the pixel lines in the horizontal direction, the vertical direction, the diagonally upper right direction, and diagonally lower right direction. Accordingly, the demosaic process circuit can adopt the pixel value of one G pixel residing adjacent in the correlation direction to the pixel to be processed, or an interpolated value of the pixel values of G pixels, as the pixel value of the G pixel at the pixel position to be processed. The mosaic images illustrated in FIGS. 12A and 12B include G pixels of 2×2 pixels as illustrated in FIG. 6. Furthermore, the images include not only these pixels but also G pixels adjacent in the horizontal direction, the vertical direction, the diagonally upper right direction and the diagonally lower right direction. Accordingly, the direction determination means can determine the correlation direction at the minimum pixel interval on the basis of these G pixels.

<Fourth Embodiment of Image Pickup Element>

Figure 13:
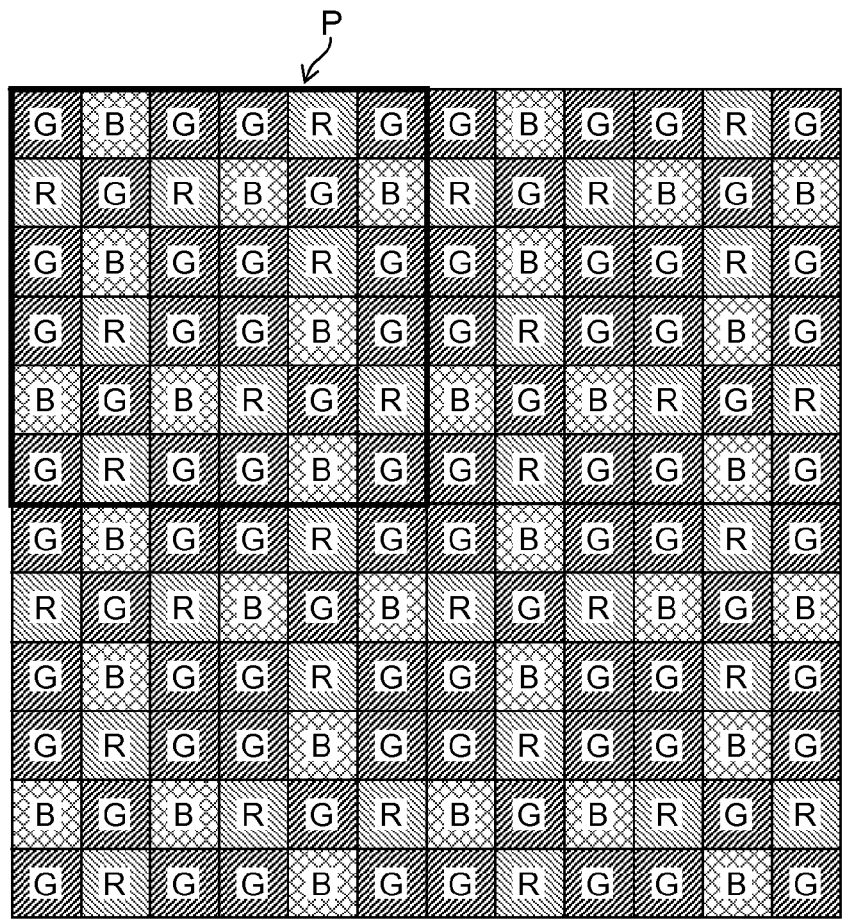
FIG. 13 is a diagram illustrating a fourth embodiment of an image pickup element.

FIG. 13 is a diagram illustrating a fourth embodiment of the image pickup element 14 and, in particular, illustrates a color filter array arranged on the light receiving surface of the image pickup element 14.

The color filter array of the image pickup element 14 includes a basic array pattern P (pattern indicated by a thick frame) corresponding to M×N (6×6) pixels. In the color filter array, the basic pattern P is repetitively arranged in the horizontal direction (H) and the vertical direction (V).

In the color filter array (mosaic image) illustrated in FIG. 13, pixels of all of R, G and B colors are arranged on each of lines in the horizontal direction and the vertical direction.

Figure 14:
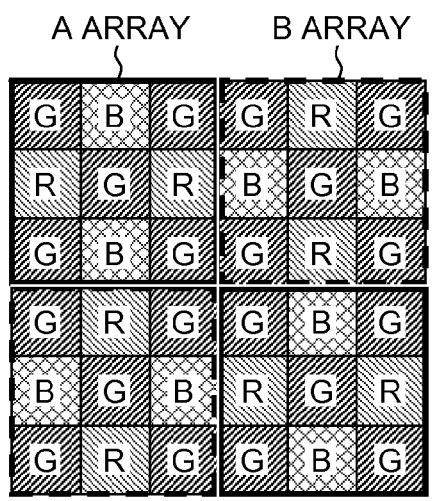
FIG. 14 is a diagram illustrating a state where a basic array pattern illustrated in FIG. 13 is quartered into 3×3-pixel A arrays and B arrays.

FIG. 14 is a diagram illustrating a state where a basic array pattern P illustrated in FIG. 13 is divided into four each including 3×3 pixels.

As illustrated in FIG. 14, the basic array pattern P can also be regarded as an array where 3×3-pixel A arrays enclosed by solid line frames and 3×3-pixel B arrays enclosed by broken line frames are alternately arranged in the horizontal and vertical directions.

In each of the A arrays and the B arrays, the G pixels that are luminance pixels are arranged at the four corners and the center, thus being arranged on both the diagonal lines. In the A array, R pixels are arranged in the horizontal direction and B pixels are arranged in the vertical direction, sandwiching the G pixel at the center. Meanwhile, in the B array, B pixels are arranged in the horizontal direction and R pixels are arranged in the vertical direction, sandwiching the G pixel at the center. That is, between the A array and the B array, the positional relationships of the R pixels and the B pixels are replaced with each other, but the other positions are the same.

The numbers of pixels of R pixels, G pixels and B pixels in the basic array pattern are 8 pixels, 20 pixels and 8 pixels, respectively. That is, the ratios of the numbers of pixels of RGB pixels are 2:5:2. The ratio of the number of G pixels is higher than each of the ratios of the numbers of R pixels and B pixels.

Figures 15A, 15B:
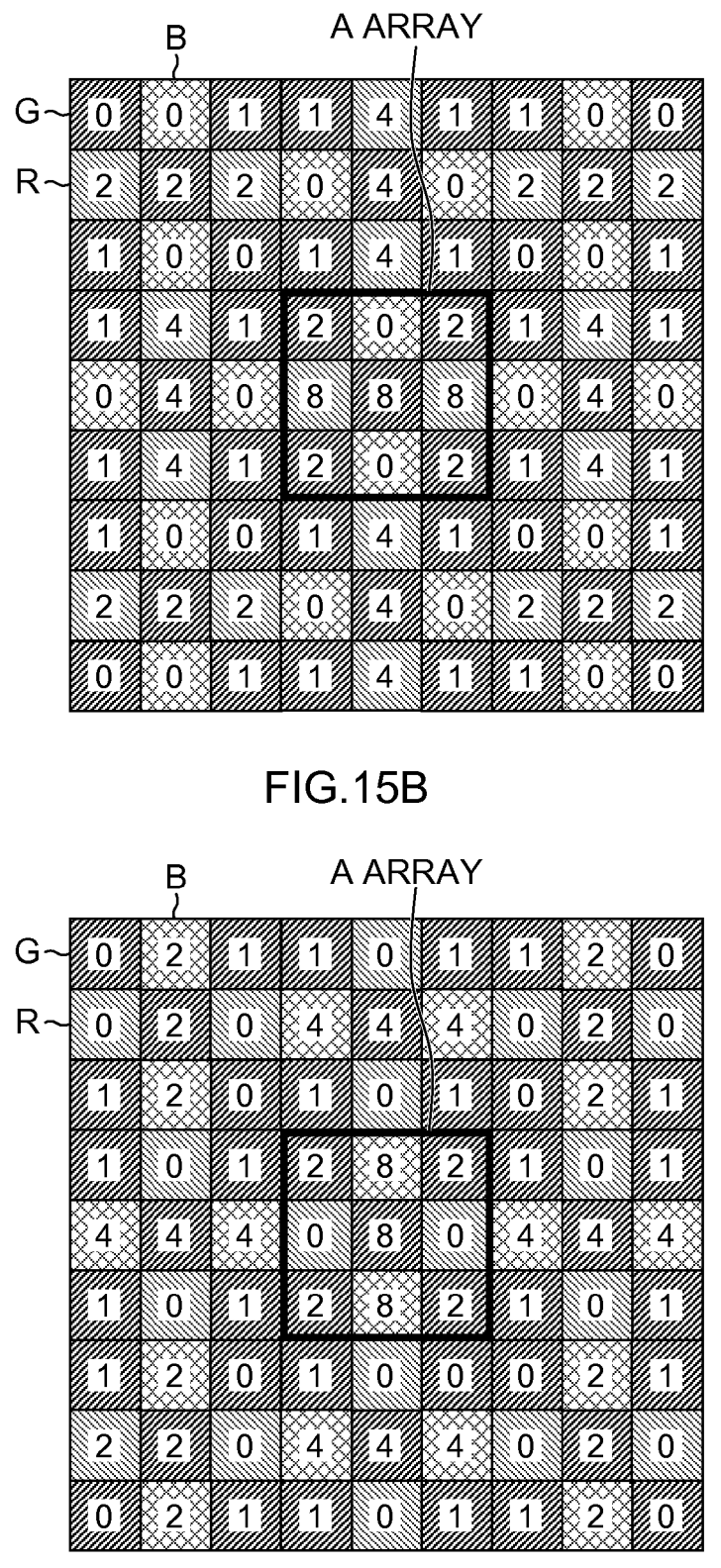

FIGS. 15A and 15B are diagrams illustrating an embodiment of a weighted average filter used for a demosaic process for a mosaic image acquired from the image pickup element of the fourth embodiment illustrated in FIG. 13, and particularly illustrating filter coefficients of the weighted average filter.

As illustrated in FIGS. 15A and 15B, each weighted average filter has a 9×9-kernel size, and is assigned filter coefficients illustrated in the diagrams.

That is, the weighting coefficients of the weighted average filter illustrated in FIG. 15A are configured such that, if the A array of the mosaic image is arranged at the center of the 9×9-kernel and then the weighting coefficients are extracted for each color of G and R colors corresponding to the color of each pixel in the kernel (local area) to acquire the total sum of the weighting coefficients, the ratio of the total sums of the weighting coefficients for the respective colors of G and R on each of pixel lines in the horizontal direction and the vertical direction is 1:1.

Likewise, the weighting coefficients of the weighted average filter illustrated in FIG. 15B are configured such that the ratio of the total sums of the weighting coefficients for the respective colors of G and B on each of pixel lines in the horizontal direction and the vertical direction is 1:1.

For instance, in FIG. 15A, the weighting coefficients on the top row are 0, 0, 1, 1, 4, 1, 1, 0 and 0. When the total sum is acquired for each of G and R in a separated manner, R=4 and G=0+1+1+1+1+0=4. It can be understood that the relationship 4:4=1:1 is hold. All the rows and columns (pixel lines in the horizontal and vertical directions) contain weighting coefficients satisfying this relationship.

Based on comparison of weighting coefficients in each area that is divided into a 3×3-size, the weighted average filter is assigned weights so as to have high weighting coefficients at the center 3×3 pixels, next high weighting coefficients arranged upper, lower, left and right sandwiching the center, and the lowest filter coefficients at the four 3×3-pixel corners.

Use of the weighted average filter illustrated in FIG. 15A allows the color ratio (Rf/Gf) in the 9×9-pixel local area to be accurately calculated without high frequency adverse effects. Likewise, use of the weighted average filter illustrated in FIG. 15B allows the color ratio (Bf/Gf) in the local area to be accurately calculated without high frequency adverse effects. The 3×3 pixels (pixels in the thick frames illustrated in FIGS. 15A and 15B) at the center of the 9×9-pixel local area are then adopted as pixels to be subjected to the demosaic process, and the R and B pixel values at each pixel position are calculated on the basis of the G pixel value at the pixel position of each pixel and the calculated color ratio. When the pixel to be processed is an R pixel or B pixel, the G pixel value is calculated on the basis of the G pixel values in the correlation direction determined by direction determination means.

After the demosaic process of calculating RGB pixel values is finished for all the 3×3 pixels at the center of the 9×9-pixel local area, the same process as described above is performed while the local area extracted from the mosaic image is shifted by 3×3 pixels at each time.

After the 9×9-pixel local area is shifted by three pixels in the horizontal direction or the vertical direction from each of the states illustrated in FIGS. 15A and 15B, the 3×3-pixel B array is positioned at the center of the shifted 9×9-pixel local area (see FIG. 14). In this case, the color ratio (Rf/Gf) between G and R can be calculated using the weighted average filter illustrated in FIG. 15B. Furthermore, the color ratio (Bf/Gf) between G and B can be calculated using the weighted average filter illustrated in FIG. 15A.

In this embodiment, 3×3 pixels are adopted as pixels to be subjected to the demosaic process, and the local area is shifted by each 3×3 pixels. However, the present invention is not limited thereto. For instance, one pixel may be adopted as a pixel to be subjected to the demosaic process, and the local area may be shifted by each pixel. In this case, many weighted average filters in conformity with the types of pixels to be processed are required to be prepared.

<Fifth Embodiment of Image Pickup Element>

Figure 16:
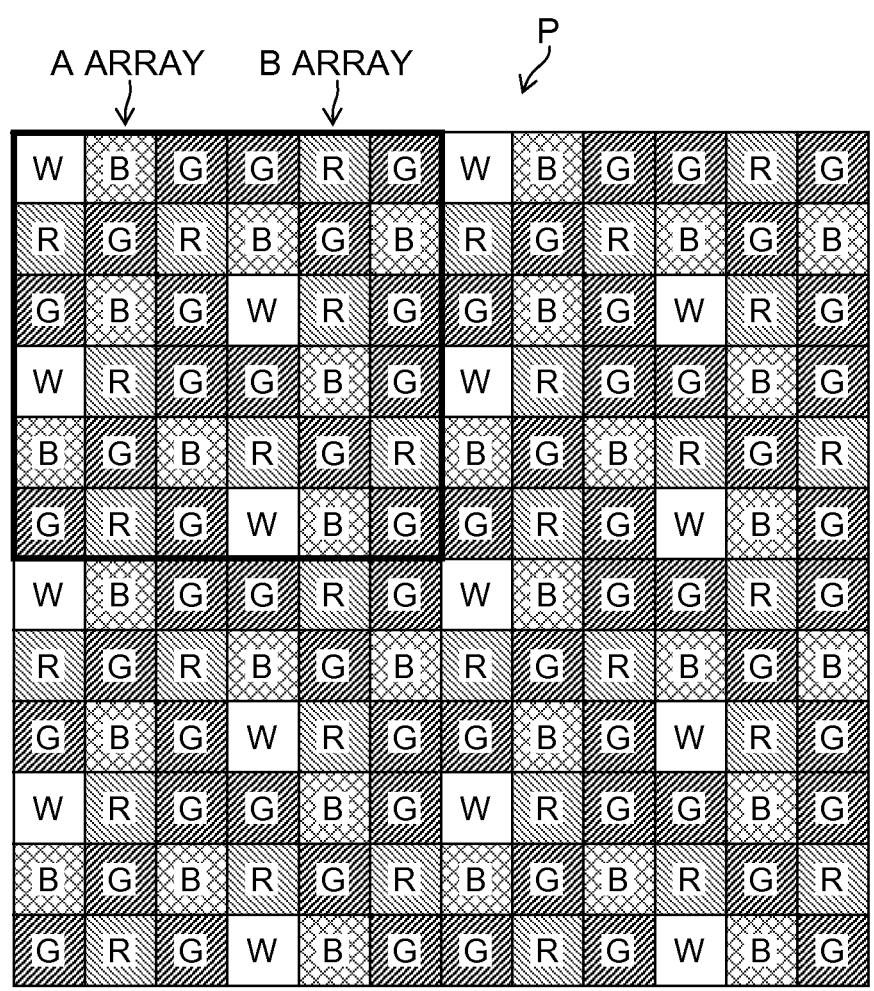
FIG. 16 is a diagram illustrating a fifth embodiment of an image pickup element.

FIG. 16 is a diagram illustrating a fifth embodiment of the image pickup element 14 and, in particular, illustrates a color filter array arranged on the light receiving surface of the image pickup element 14.

A color filter array (mosaic image) illustrated in FIG. 16 is a variation of the fourth embodiment illustrated in FIG. 13. The color filter array illustrated in FIG. 16 is different in that W pixels including transparent (W) filters are arranged instead of the upper left G pixel in the A array and the lower left G pixel in the B array illustrated in FIG. 14.

As illustrated in FIG. 16, the numbers of pixels of R pixels, G pixels, B pixels and W pixels corresponding to the R filters, G filters, B filters and W filters in the 6×6-pixel basic array pattern P are 8 pixels, 16 pixels, 8 pixels and 4 pixels, respectively. The assigned number of luminance pixels (G pixels and W pixels) is more than each of the assigned numbers of R pixels and B pixels. That is, in comparison with the R pixels and the B pixels, the ratio of the number of G pixels and W pixels that have a high contribution ratio for acquiring a luminance signal is higher than each of the ratios of the numbers of pixels of R pixels and B pixels.

FIGS. 17A and 17B are diagrams illustrating an embodiment of a weighted average filter used for a demosaic process for a mosaic image acquired from the image pickup element of the fifth embodiment illustrated in FIG. 16, and particularly illustrating filter coefficients of the weighted average filter.

As illustrated in FIGS. 17A and 17B, the weighted average filters have the same kernel size as the size of a 6×6-pixel basic array pattern P. FIG. 17A illustrates a weighted average filter for calculating the color ratio between G and R in a kernel corresponding to a local area. FIG. 17B illustrates a weighted average filter for calculating the color ratio between G and B in the kernel corresponding to the local area.

The weighting coefficients in the weighted average filter illustrated in FIG. 17A are configured such that the ratio between the total sum of the weighting coefficients for G pixels and the total sum of the weighting coefficients for R pixels on the pixel lines in the horizontal direction in the kernel is 1:1, and the ratio between the total sum of the weighting coefficients for G pixels and the total sum of the weighting coefficients for R pixels on the pixel lines in the vertical direction in the kernel is 1:1.

Likewise, in the weighted average filter illustrated in the FIG. 17B, the weighting coefficients are configured such that the ratio between the total sum of the weighting coefficients for G pixels and the total sum of the weighting coefficients for B pixels on the pixel lines in the horizontal direction in the kernel is 1:1, and the ratio between the total sum of the weighting coefficients for G pixels and the total sum of the weighting coefficients for B pixels on the pixel lines in the vertical direction in the kernel is 1:1.

Use of the weighted average filter allows the color ratios ((Rf/Gf), (Bf/Gf)) in the local area to be accurately calculated without high frequency adverse effects. The basic array pattern P includes G pixels adjacent in the horizontal direction, the vertical direction, the diagonally upper right direction and the diagonally lower right direction. Accordingly, the direction determination means can determine the correlation direction of the adjacent luminance of the pixel to be subjected to the demosaic process at the minimum pixel interval on the basis of these G pixels.

<Spectral Sensitivity Characteristics of R, G, B and W Pixel>

Figure 18:
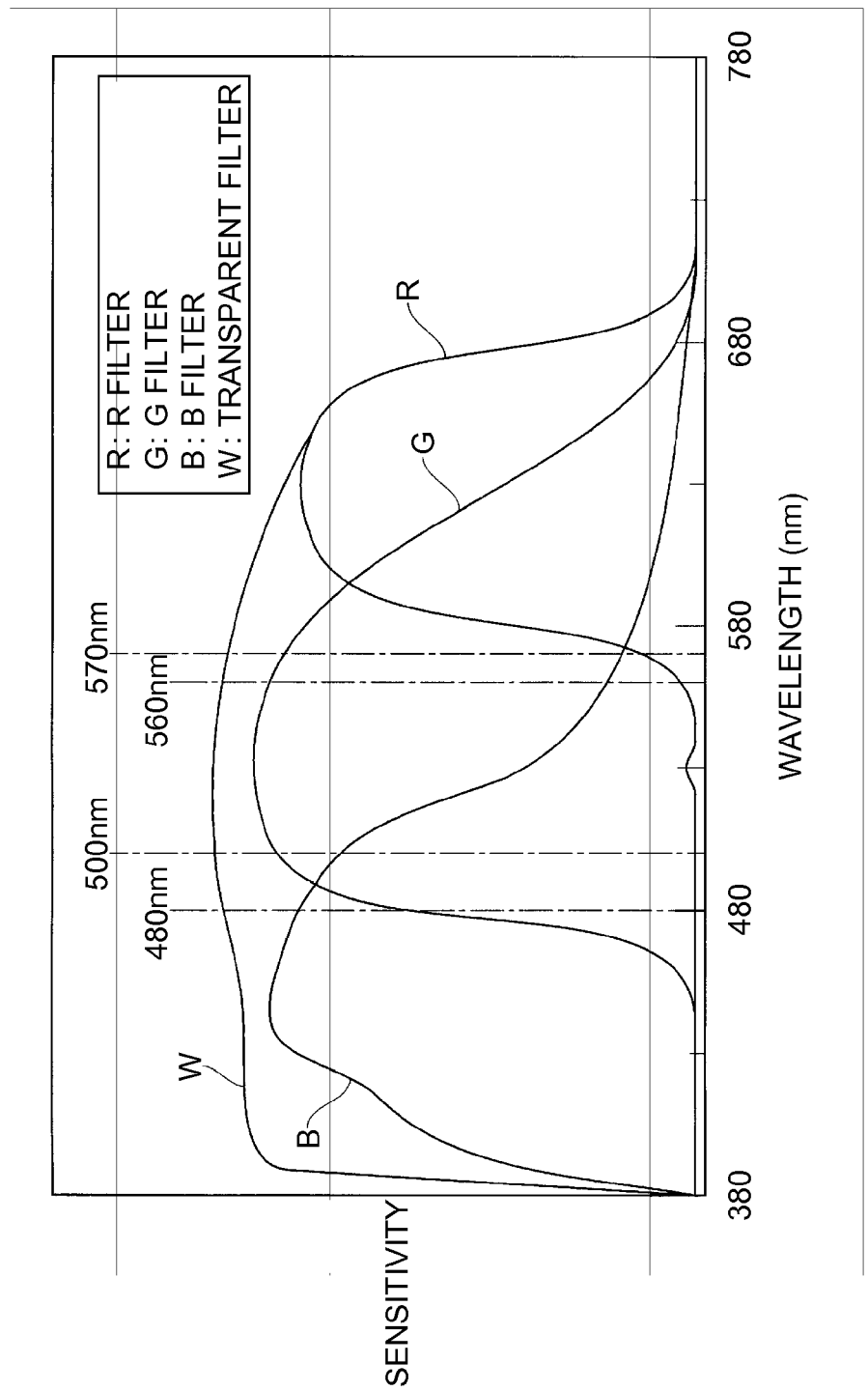
FIG. 18 is a graph illustrating spectral sensitivity characteristics of photodiodes on which R filters, G filters, B filters and W filters are arranged.

FIG. 18 is a graph illustrating an example of spectral sensitivity characteristics of photodiodes (R, G, B and W pixels) on which R filters, G filters, B filters and W filters are arranged.

As illustrated in FIG. 18, the spectral sensitivity characteristics of the W pixel provided with the W filter are spectral sensitivity characteristics to which spectral sensitivity characteristics of R, G and B pixels are added together. The wavelength range of the sensitivity includes the wavelength regions of the R, G and B pixels.

The peak of transmittance of W filter (peak of sensitivity of W pixel) ranges from 480 nm to 570 nm, both inclusive. The transmittance of W filter is higher than each of the transmittances of R and B filters in a range from 500 nm to 560 nm, both inclusive.

Incidentally, the image signal of the G pixels has a higher contribution ratio during generation of the luminance signal than image signals of the R pixels and the B pixels have. More specifically, the image processor 18 generates a Y signal for each pixel on the basis of the RGB pixel signal including color information on all RGB according to the following expression (5).

$$Y=0.3R+0.59G+0.11B \tag{5}$$

According to this expression (5), the contribution ratio of G color is 59%. Accordingly, the G color has a higher contribution ratio than the R color (contribution ratio of 30%) and the B color (contribution ratio of 11%) have. Thus, the G color is a color that most contributes to the luminance signal among the three primary colors.

The image signal of the W pixel as it is can be regarded as a luminance signal. However, in the case of the image pickup element of the above embodiment including G pixels and W pixels in a mixed manner, the luminance signal is generated by mixing the luminance signal calculated by the expression (5) and the image signal (luminance signal) of the W pixel at a certain ratio. The image signal of the W pixel is more similar to the luminance signal than the image signal of the G pixel, and thus more similar to the luminance signal than each of the image signals of the R pixel and B pixel, which is a matter of course. The mixed luminance signal is calculated by, for instance, the following expression (6).

$$Y=0.5W+0.5(\mathbf{0.3}R+0.59G+0.11B) \tag{6}$$

That is, each of the luminance pixels (G pixels and W pixels) corresponding to first colors that are one or more colors of the present invention has a contribution ratio for acquiring the luminance signal of 50% or more. Each of pixels (R pixels and B pixels) corresponding to second colors that are two or more colors and other than the first colors has a contribution ratio that is for acquiring the luminance signal and is less than 50%. Here, 50% is a value defined so as to discriminate the first colors and the second colors from each other with reference to the contribution ratio, and is a value defined such that a color having a relatively higher contribution ratio for acquiring the luminance signal than the R color, B color, etc. have is classified as the "first color".

<Sixth Embodiment of Image Pickup Element>

Figure 19:
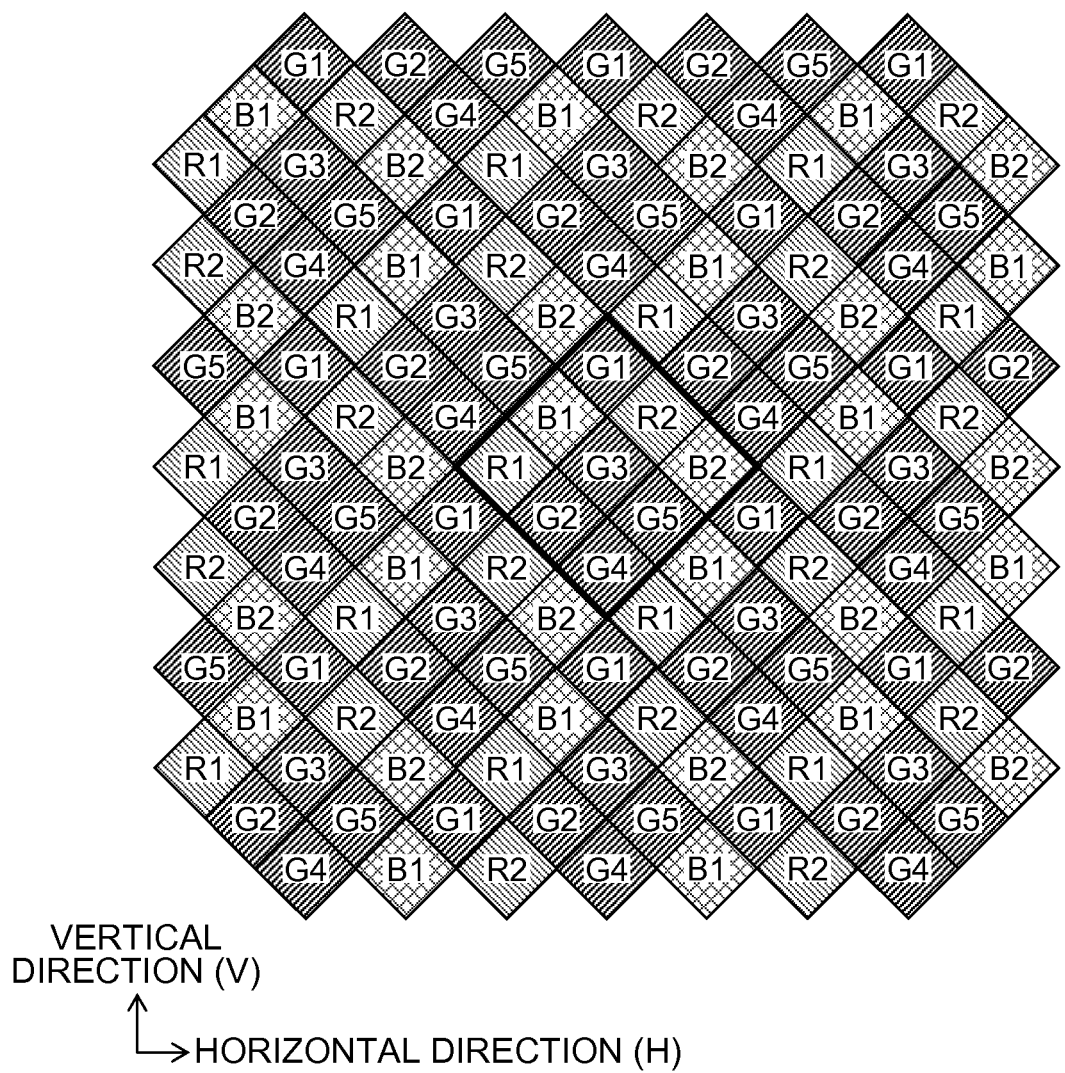
FIG. 19 is a diagram illustrating a sixth embodiment of an image pickup element.

FIG. 19 is a diagram illustrating a sixth embodiment of the image pickup element 14 and, in particular, illustrates a color filter array arranged on the light receiving surface of the image pickup element 14.

The color filter array (mosaic image) illustrated in FIG. 19 corresponds to an array acquired by turning the color filter array of the first embodiment illustrated in FIG. 4 by 45°.

In the case of the image pickup element where multiple pixels are arranged into an oblique lattice, the reproducible band in the horizontal and vertical directions is √2 times as large as that of the image pickup element with a square lattice arrangement. Such a configuration conforms to characteristics that the frequency characteristics of human vision are higher in the horizontal and the vertical direction than those in oblique directions. It can thus be said that this configuration is visually advantageous.

In the case of the image pickup element as in the sixth embodiment where the multiple pixels are arranged into an oblique lattice, the diagonally upper right direction corresponds to one direction between the first direction and the second direction of the present invention, and the diagonally lower right direction corresponds to the other direction between a third direction and a fourth direction of the present invention.

The demosaic process according to the present invention can be appropriately applied also to the color filter array (mosaic image) illustrated in FIG. 19.

[Another Embodiment of Demosaic Process]

In the foregoing embodiment, the R and B pixel values at each pixel position are calculated on the basis of the color ratios ((Rf/Gf), (Bf/Gf)) of G and R, and G and B, and the G pixel value at the pixel position to be processed in the local area. However, the present invention is not limited thereto. For instance, the R and B pixel values at each pixel position may be calculated on the basis of the color differences between G and R and between G and B, and the G pixel value at the pixel position to be processed.

More specifically, the weighted average value is calculated by the weighted average filter dividing each of the product-sum operation values (Rf, Gf and Bf) of G and R, and G and B, by the total sum of the weighting coefficients in the local area. These weighted average values are defined as Rf', Gf' and Bf'. The pixel to be subjected to the demosaic process is a G pixel. The pixel value thereof is defined as G. In this case, the pixel values of R and B for R and B colors at the pixel position to be processed are calculated by the following expressions.

$$R = G + (Rf' - Gf') \quad (7)$$

$$B = G + (Bf' - Gf') \quad (8)$$

When the pixel to be subjected to the demosaic process is an R pixel or a B pixel, the pixel value of one G pixel residing adjacent in the correlation direction to the pixel to be processed, or an interpolated value of the pixel values of G pixels is calculated as the G pixel value at the pixel position to be processed. The calculated G pixel value is defined as G'. In this case, each of the pixel values B and R for B and R colors at the pixel position of the R pixel or the B pixel is calculated by the following expression.

$$B = G' + (Bf' - Gf') \quad (9)$$

$$R = G' + (Rf' - Gf') \quad (10)$$

In the weighted average filter according to the present invention, the weighting coefficients are configured such that the ratio between the total sum of the weighting coefficients for G pixels and the total sum of the weighting coefficients for B pixels on the pixel lines in the horizontal direction in the kernel is 1:1, and the ratio between the total sum of the weighting coefficients for G pixels and the total sum of the weighting coefficients for B pixels on the pixel lines in the vertical direction in the kernel is 1:1. Accordingly, even if high frequency input is made into in the horizontal direction or the vertical direction, correct color differences in the local area can be calculated without deviation of the relationship of the difference value (Bf'−Gf') between G and B weighted average values acquired using the weighting coefficients. Likewise, the G and B color difference (Rf'−Gf') in the local area can be correctly calculated. Accurate calculation can be performed by interpolating the R and B pixel values at the pixel position to be processed on the basis of the color differences.

Another embodiment of the image pickup apparatus 10 may be, for instance, a mobile phone having a camera function, a smartphone, a PDA (Personal Digital Assistants) or a mobile game machine. Hereinafter, a smartphone is exemplified, and described in detail with reference to the drawings.

<Configuration of Smartphone>

Figure 20:
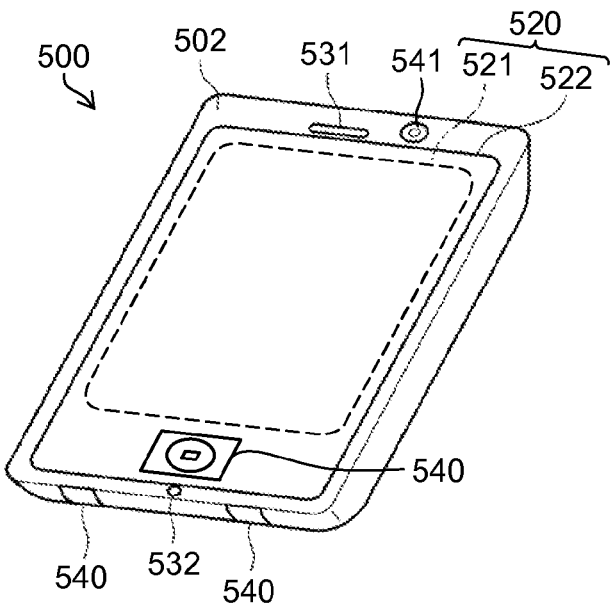
FIG. 20 is an appearance diagram of a smartphone that is another embodiment of an image pickup apparatus.

FIG. 20 illustrates an appearance of a smartphone 500 that is another embodiment of the image pickup apparatus 10. The smartphone 500 illustrated in FIG. 20 has a flat-shaped casing 502, and includes a display input unit 520 in which a display panel 521 as a display unit and an operation panel 522 as an input unit are integrated on one surface of the casing 502. Furthermore, the casing 502 includes a speaker 531, a microphone 532, an operation unit 540, and a camera unit 541. Note that the configuration of the casing 502 is not limited thereto. Alternatively, for instance, a configuration where the display unit and the input unit are independent from each other may be adopted, or a configuration that has a folding structure or a sliding mechanism may be adopted.

Figure 21:
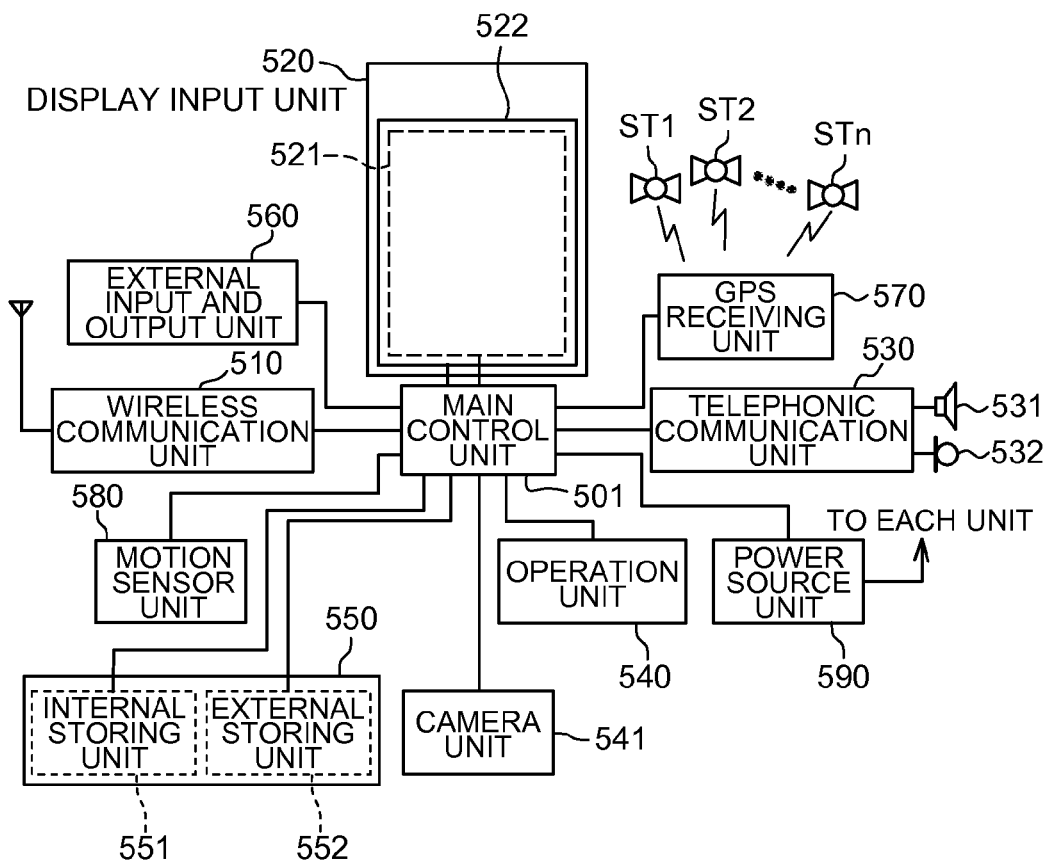
FIG. 21 is a block diagram illustrating a configuration of a main part of the smartphone.

FIG. 21 is a block diagram illustrating a configuration of the smartphone 500 illustrated in FIG. 20. As illustrated in FIG. 21, the smartphone 500 includes a wireless communication unit 510, a display input unit 520, a telephonic communication unit 530, the operation unit 540, the camera unit 541, a storing unit 550, an external input and output unit 560, a GPS (Global Positioning System) receiving unit 570, a motion sensor unit 580, a power source unit 590, and a main control unit 501. Furthermore, the smartphone 500 has a wireless communication function of performing mobile wireless communication via a base station apparatus BS and a mobile communication network NW.

The wireless communication unit 510 performs wireless communication to the base station apparatus BS accommodated in the mobile communication network NW according to instructions from the main control unit 501. Through use of the wireless communication, various types of file data, such as audio data and image data, and email data and the like are transmitted and received, and web data and streaming data are received.

The display input unit 520 is what is called a touch panel that is controlled by the main control unit 501 to display images (still images and moving images) and character information and the like and visually transmit information to the user, and detect a user operation that is made in response to the displayed information. The display input unit 520 includes the display panel 521 and the operation panel 522. Preferably, for viewing the generated 3D images, the display panel 521 is a 3D display panel.

The display panel 521 is a LCD (Liquid Crystal Display), an OELD (Organic Electro-Luminescence Display) or the like that is used as a display device. The operation panel 522 is a device that is disposed on a display screen of the display panel 521 in a manner allowing a displayed image to be viewed, and operated by a finger of the user or a stylus and detects one or multiple coordinates. When the device is operated by the finger of the user or the stylus, a detection signal generated by the operation is output to the main control unit 501. Next, the main control unit 501 detects an operation position (coordinates) on the display panel 521 on the basis of the received detection signal.

As illustrated in FIG. 20, the display panel 521 and the operation panel 522 of the smartphone 500 are integrated to configure the display input unit 520, and are arranged such that the operation panel 522 completely covers the display panel 521. In the case of adopting this arrangement, the operation panel 522 may has a function of detecting a user operation also in a region out of the display panel 521. In other words, the operation panel 522 may include a detection area for an overlap portion overlapping with the display panel 521 (hereinafter, referred to as a display region) and another detection area for a peripheral portion that does not overlap with the display panel 521 (hereinafter, referred to as non-display region).

The size of the display area and the size of the display panel 521 may be completely matched with each other. Alternatively, it is not necessarily to match both areas. Furthermore, the operation panel 522 may include two sensing areas that are a peripheral portion and an inner portion other than the peripheral portion. Moreover, the width of the peripheral portion is appropriately designed according to the size of the casing 502. Furthermore, a position detection scheme adopted in the operation panel 522 may be any of a matrix switch scheme, a resistance film scheme, a surface acoustic wave scheme, an infrared scheme, an electromagnetic induction scheme, a capacitance scheme and the like. Any of these schemes may be adopted.

The telephonic communication unit 530 includes the speaker 531 and the microphone 532. The telephonic communication unit 530 converts an audio of the user input via the microphone 532 into audio data that can be processed in the main control unit 501 and outputs the data to the main control unit 501, and decodes the audio data received by the wireless communication unit 510 or the external input and output unit 560 and outputs the data from the speaker 531. As illustrated in FIG. 20, for instance, the speaker 531 can be mounted on the same surface as the surface on which the display input unit 520 is arranged. The microphone 532 can be mounted on the side surface of the casing 502.

The operation unit 540 is hardware keys using key switches and the like, and receives an instruction from the user. For instance, as illustrated in FIG. 20, the operation unit 540 is mounted below or on a lower side of the display unit on the casing 502 of the smartphone 500. This operation unit is a press button switch that is turned on by being depressed by a finger or the like, and turned off by the resilience of a spring or the like when the finger is removed.

The storing unit 550 stores a control program and control data for the main control unit 501, address data associated with the names and phone numbers of communication opposite parties, data on transmitted and received email, web data downloaded through web browsing, and downloaded content data, and temporarily stores streaming data. The storing unit 550 includes an internal storing unit 551 embedded in the smartphone, and an external storing unit 552 having a detachable external memory slot. Note that the internal storing unit 551 and the external storing unit 552, which configure the storing unit 550, are achieved using any of storing media, such as a flash memory type, hard disk type, multimedia card micro type, and card type memories (e.g. Micro SD (Registered Trademark) memory etc.), a RAM (Random Access Memory), and a ROM (Read Only Memory).

The external input and output unit 560 serves as an interface with all external devices connected to the smartphone 500, and is for direct or indirect connection to an external device via communication or the like (e.g., Universal Serial Bus (USB), IEEE1394 (The Institute of Electrical and Electronics Engineers, Inc.), etc.) or a network (e.g., the Internet, wireless LAN, Bluetooth (Registered Trademark), RFID (Radio Frequency Identification), infrared communication (Infrared Data Association: IrDA) (Registered Trademark), UWB (Ultra Wideband) (Registered Trademark), ZigBee (Registered Trademark), etc.).

The external devices connected to the smartphone 500 are, for instance, wired and wireless headsets, wired and wireless external chargers, wired and wireless data ports, a memory card connected via a card socket, SIM (Subscriber Identity Module Card)/UIM (User Identity Module Card) card, an external audio video device connected via an audio video I/O (Input/Output) terminal, a wirelessly connected external audio video device, smartphones connected in wired and wireless manners, personal computers connected in wired and wireless manners, PDAs connected in wired and wireless manners, and personal computers and earphones connected in wired and wireless manners. The external input and output unit can transmits data sent from such an external device, to each configuration element in the smartphone 500, and allows data in the smartphone 500 to be transmitted to the external device.

The GPS receiving unit 570 receives GPS signals transmitted from GPS satellites ST1 to STn, according to an instruction by the main control unit 501, executes a positioning operation process based on the received GPS signals, and detects the position of the smartphone 500 that includes the latitude, longitude and altitude. When position information can be acquired from the wireless communication unit 510 or the external input and output unit 560 (e.g. a wireless LAN), the GPS receiving unit 570 can detect the position using the position information.

The motion sensor unit 580 includes, for instance, three-axis acceleration sensor and the like, and detects physical movement of the smartphone 500 according to the instruction by the main control unit 501. Through detection of the physical movement of the smartphone 500, the movement direction and acceleration of the smartphone 500 are detected. The detection result is output to the main control unit 501.

The power source unit 590 supplies power stored in a battery (not illustrated) to each unit of the smartphone 500 according to the instruction by the main control unit 501.

The main control unit 501 includes a microprocessor, operates according to a control program and control data stored in the storing unit 550, and integrally controls each unit of the smartphone 500. The main control unit 501 has a mobile communication function of controlling each unit of the communication system and an application processing function for performing audio communication and data communication via the wireless communication unit 510.

The application processing function can be achieved by the main control unit 501 operating according to application software stored in the storing unit 550. The application processing function is, for instance, an infrared communication function of controlling the external input and output unit 560 to perform data communication with an opposite device, an email function of transmitting and receiving email, and a web browsing function of browsing web pages.

The main control unit 501 has an image processing function of displaying video on the display input unit 520 on the basis of image data (data on a still image or a moving image), such as received data or downloaded streaming data. The image processing function is a function where the main control unit 501 performs a process of developing RAW data, which includes the demosaic process according to the present invention, and causes a storing unit 550 to store an image as a processing result or display the image on the display input unit 520.

Furthermore, the main control unit 501 executes display control for the display panel 521, and operation detection control that detects user operations via the operation unit 540 and the operation panel 522.

According to execution of the display control, the main control unit 501 displays software keys, such as an icon for activating application software, and scrollbars, and further displays a window for creating email. Note that the scrollbars are software keys for accepting instructions for moving a displayed part of an image that is large and cannot be accommodated in a display region on the display panel 521.

Through execution of the operation detection control, the main control unit 501 detects a user operation via the operation unit 540, accepts an operation to the icon and an input of a character string into an input field in the window via the operation panel 522, and accepts a request of scrolling the displayed image via the scrollbars.

Furthermore, the main control unit 501 has a touch panel control function of determining whether the operation position on the operation panel 522 is in the overlap portion (display area) overlapping with the display panel 521 or the other peripheral portion that does not overlap with the display panel 521 (non-display area) and of controlling the sensing region of the operation panel 522 and the display position of the software keys.

The main control unit 501 can detect a gesture operation on the operation panel 522, and execute a preset function in response to the detected gesture operation. The gesture operation is not a conventional simple touch operation, but means drawing a trajectory by a finger, simultaneously designating multiple points, and drawing a trajectory from at least one of the multiple positions through combination of these operations.

The camera unit 541 is a digital camera that electronically takes an image using an image pickup element, such as a CMOS (Complementary Metal Oxide Semiconductor) or a CCD (Charge-Coupled Device), and has a function equivalent to the function illustrated in the block diagram of FIG. 3. The camera unit 541 converts image data acquired by imaging into, for instance, compressed image data, such as JPEG (Joint Photographic coding Experts Group), records the data in the storing unit 550, and outputs the data via the external input and output unit 560 and the wireless communication unit 510, through control by the main control unit 501. In the smartphone 500 illustrated in FIG. 20, the camera unit 541 is mounted on the same surface as that of the display input unit 520. However, the mount position of the camera unit 541 is not limited thereto. Alternatively, this unit may be mounted on the back of the display input unit 520, or multiple camera units 541 may be mounted. In the case where multiple camera units 541 are mounted, a camera unit 541 used for imaging may be switched to solely take an image, or the multiple camera units 541 may be simultaneously used for taking images.

The camera unit 541 can be used for various functions of the smartphone 500. For instance, an image acquired by the camera unit 541 can be displayed on the display panel 521. As one of input operations on the operation panel 522, an image from the camera unit 541 can be used. When the GPS receiving unit 570 detects the position, the image from the camera unit 541 may be referred to and the position may be detected. Furthermore, the image from the camera unit 541 can be referred to, and the optical axis direction of the camera unit 541 of the smartphone 500 can be detected without use of a three-axis acceleration sensor or together with use of the three-axis acceleration sensor, and the current usage environment can be detected. It is a matter of course that the image from the camera unit 541 can be used in the application software.

[Others]

In this embodiment, the image pickup apparatus has been described. Alternatively, the present invention is applicable to an image processing apparatus, such as a personal computer, which acquires a mosaic image from an image pickup apparatus capable of recording RAW data (mosaic image), and applies, to the mosaic image, various types of image processing ("RAW development") including the demosaic process according to the present invention. The present invention includes RAW development software (image processing program) that is installed in a general-purpose personal computer to thereby cause the personal computer to function as the image processing apparatus, and a non-transitory recording medium storing the RAW development software.

The present invention is applicable not only to the mosaic image of this embodiment but also to various objects. That is, the present invention is applicable to any mosaic image to which weighting coefficients according to the present invention are assigned.

Furthermore, the present invention accurately estimates the colors (color ratios and color differences) in the local area, and performs the demosaic process. Accordingly, occurrence of color moire and false color can be reduced. This reduction can omit an optical low pass filter for reducing occurrence of color moire and the like in the image pickup apparatus. Alternatively, even in the case of applying the optical low pass filter, the filter may have a weak function of cutting the high frequency component for preventing the color moire and the like from occurring and thus can prevent the resolution from being degraded.

In the foregoing embodiments, the demosaic process for an RGB or RGBW mosaic image has been described. However, the present invention is not limited thereto, and is also applicable to a mosaic image of four colors that are three RGB primary colors and another color (e.g., emerald (E)).

The present invention is applicable to a complementary color mosaic image of four colors that include complementary colors of the RGB primary colors, i.e., (C) cyan, M (magenta) and Y (yellow), and further include G.

Furthermore, it is a matter of course that the present invention is not limited to the foregoing embodiments, and various modifications may be made in a scope without departing from the spirit of the present invention.

What is claimed is:

1. An image processing apparatus, comprising:
an image acquisition unit configured to acquire a mosaic image which is acquired from an image pickup element provided with color filters according to a predetermined color filter array and corresponds to the color filter array, the color filters including first filters corresponding to at least one first color, and second filters corresponding to at least two second colors having a lower contribution ratio for acquiring a luminance signal than the first color, the color filters being placed on a plurality of pixels including photo-electric conversion elements arranged in a first direction and a second direction which is perpendicular to the first direction;
an operation unit configured to calculate a product-sum operation value for the first color and a product-sum operation value for each color among the second colors, based on first weighting coefficients and second weighting coefficients and on a pixel value of a pixel of the first color and a pixel value of a pixel of each color of the second colors in a local area extracted from the mosaic image and corresponding to a predetermined kernel size, the operation unit having the first weighting coefficients configured to correspond to each color among the second colors and correspond to the first color in the predetermined kernel size, and the second weighting coefficients configured to correspond to each color among the second colors, the first weighting coefficients and the second weighting coefficients being configured such that a ratio between a total sum of the first weighting coefficients and a total sum of the second weighting coefficients on pixel lines in the first direction and the second direction in the kernel size is 1:1; and
an image processing unit configured to calculate a pixel value of each color of the second colors at a pixel position of each pixel to be processed in the local area, based on the pixel value of the first color at the pixel position, and the product-sum operation value for the first color and the product-sum operation value for each color among the second colors calculated by the operation unit.

2. The image processing apparatus according to claim 1, wherein the mosaic image includes at least one group of two pairs of pixels for each color of the second colors in the local area corresponding to the kernel size, the group including the first color at one pair of diagonal positions and one color among the second colors at other pair of diagonal positions in at least one of any quadrilaterals having sides parallel to the first direction and the second direction.

3. The image processing apparatus according to claim 1, wherein the mosaic image includes a basic array pattern corresponding to M×N pixels (M≥3, N≥3) in the first direction and the second direction, and the basic array pattern is repeatedly arranged in the first direction and the second direction.

4. The image processing apparatus according to claim 1, wherein the mosaic image includes a pixel line including not all of the second colors, on the pixel lines in the first direction and the second direction.

5. The image processing apparatus according to claim 1, further comprising
a control unit configured to repeatedly operate the operation unit and the image processing unit while shifting the local area by units of object pixels to be processed with respect to the mosaic image.

6. The image processing apparatus according to claim 1, wherein the mosaic image includes G pixels corresponding to a green (G) color belonging to the first color, and R pixels and B pixels corresponding to red (R) and blue (B) colors, respectively, belonging to the second colors,
when product-sum operation values of pixel values of the R, G and B pixels calculated by the operation unit with respect to the individual colors are defined as Rf, Gf and Bf, respectively, and
if an object pixel to be processed is a G pixel, the image processing unit calculates color ratios (Rf/Gf) and (Bf/Gf) that are ratios between the product-sum operation value of the G pixels and the respective product-sum operation values of the R pixels and the B pixels, and calculates pixel values of the R and B pixels at a position of the pixel to be processed, based on the calculated color ratios (Rf/Gf) and (Bf/Gf) and the pixel value of the G pixel to be processed.

7. The image processing apparatus according to claim 1, wherein the mosaic image includes G pixels corresponding to a green (G) color belonging to the first color, and R pixels and B pixels corresponding to red (R) and blue (B) colors, respectively, belonging to the second colors,
when product-sum operation values of pixel values of the R, G and B pixels calculated by the operation unit with respect to the individual colors are defined as Rf, Gf and Bf, respectively, and,
if an object pixel to be processed is an R pixel, the image processing unit calculates a color ratio (Bf/Gf) that is a ratio between the product-sum operation value of the G pixels and the product-sum operation value of the B pixels, and calculates a pixel value of a B pixel at a position of the pixel to be processed, based on the calculated color ratio (Bf/Gf) and a pixel value of a G pixel that is calculated for the position of the pixel to be processed, and
if an object pixel to be processed is a B pixel, the image processing unit calculates a color ratio (Rf/Gf) that is a ratio between the product-sum operation value of the G pixels and the product-sum operation value of the R pixels, and calculates a pixel value of an R pixel at a position of the pixel to be processed, based on the calculated color ratio (Rf/Gf) and the pixel value of the G pixel that is calculated for the position of the pixel to be processed.

8. The image processing apparatus according to claim 1, wherein the mosaic image includes G pixels corresponding to a green (G) color belonging to the first color, and R pixels and B pixels corresponding to red (R) and blue (B) colors, respectively, belonging to the second colors,
when weighted average values acquired by dividing product-sum operation values of pixel values of the R, G and B pixels calculated through the operation unit by the total sum of the weighting coefficients with respect to the individual colors are defined as Rf', Gf' and Bf', respectively, and
if an object pixel to be processed is a G pixel, the image processing unit calculates color differences (Rf'−Gf') and (Bf'−Gf') that are differences between the weighted average value of the G pixels and the respective weighted average values of the R pixels and the B pixels, and calculates pixel values of the R and B pixels at a position of the pixel to be processed, based on the calculated color differences (Rf'−Gf') and (Bf'−Gf') and the pixel value of the G pixel to be processed.

9. The image processing apparatus according to claim 1, wherein the mosaic image includes G pixels corresponding to a green (G) color belonging to the first color, and R pixels and B pixels corresponding to red (R) and blue (B) colors, respectively, belonging to the second colors,
when weighted average values acquired by dividing product-sum operation values of pixel values of the R, G and B pixels calculated through the operation unit with respect to the individual colors by a total sum of weighting coefficients are defined as Rf, Gf and Bf, respectively, and
if an object pixel to be processed is an R pixel, the image processing unit calculates a color difference (Bf'−Gf') that is a difference between the weighted average value of the G pixels and the weighted average value of the B pixels, and calculates a pixel value of a B pixel at a position of the pixel to be processed, based on the calculated color difference (Bf'−Gf') and a pixel value of a G pixel that is calculated for the position of the pixel to be processed, and,
if an object pixel to be processed is a B pixel, the image processing unit calculates a color difference (Rf'−Gf') that is a difference between the weighted average value of the G pixels and the weighted average value of the R pixels, and calculates a pixel value of an R pixels at a position of the pixel to be processed, based on the calculated color difference (Rf'−Gf') and the pixel value of the G pixel that is calculated for the position of the pixel to be processed.

10. The image processing apparatus according to claim 7, further comprising
a direction determination unit configured to determine a luminance correlation direction from among the first direction, the second direction, a third direction and a fourth direction, the third direction and the fourth direction being inclined from the first and second directions, based on pixel values of pixels of the first color adjacent to the pixel to be processed in the mosaic image,
wherein if the pixel at the position of the pixel to be processed is an R pixel or a B pixel, the image processing unit calculates a pixel value of a G pixel for the position of the pixel using pixel values of G pixels residing in the correlation direction determined by the direction determination unit.

11. The image processing apparatus according to claim 10, wherein at least one pixel of the first color in the mosaic image is arranged on each of pixel lines in the first direction, the second direction, the third direction and the fourth direction.

12. The image processing apparatus according to claim 10, wherein the direction determination unit acquires pixel values of pixels of a same first color adjacent in the first direction, the second direction, the third direction and the fourth direction to the pixel to be processed in the mosaic image, and determines the luminance correlation direction based on difference values of pixel values of adjacent pixels of a same color.

13. The image processing apparatus according to claim 12, wherein the direction determination unit calculates multiple absolute difference values of pixel values of adjacent pixels of the same colors in the individual first direction, the second direction, the third direction and the fourth direction, and determines, as the correlation direction, a direction with a minimum total sum or a minimum average value of the absolute difference values in the respective directions.

14. An image pickup apparatus comprising the image processing apparatus according to claim 1.

15. An image processing method, comprising:
an image acquisition step of acquiring a mosaic image which is acquired from an image pickup element provided with color filters according to a predetermined color filter array and corresponds to the color filter array, the color filters including first filters corresponding to at least one first color, and second filters corresponding to at least two second colors having a lower contribution ratio for acquiring a luminance signal than the first color, the color filters being placed on a plurality of pixels including photo-electric conversion elements arranged in a first direction and a second direction perpendicular to the first direction;
an operation step of calculating a product-sum operation value for the first color and a product-sum operation value for each color among the second colors, based on first weighting coefficients and second weighting coefficients and on a pixel value of a pixel of the first color and a pixel value of a pixel of each color of the second colors in a local area extracted from the mosaic image and corresponding to a predetermined kernel size, the operation step performing calculation using the first weighting coefficients configured to correspond to each color among the second colors and correspond to the first color in the predetermined kernel size, and the second weighting coefficients configured to correspond to each color among the second colors, the first weighting coefficients and the second weighting coefficients being configured such that a ratio between a total sum of the first weighting coefficients and a total sum of the second weighting coefficients on pixel lines in the first direction and the second direction in the kernel size is 1:1; and
an image processing step of calculating a pixel value of each color of the second colors at a pixel position of each pixel to be processed in the local area, based on the pixel value of the first color at the pixel position, and the product-sum operation value for the first color and the product-sum operation value for each color among the second colors calculated by the operation step,
wherein the method repeatedly operates processes by the operation step and the image processing step while shifting the local area by units of object pixels to be processed with respect to the mosaic image.

16. A non-transitory computer-readable recording medium storing instructions, wherein when the instructions are read by a processor, the processor executes:
an image acquisition step of acquiring a mosaic image which is acquired from an image pickup element provided with color filters according to a predetermined color filter array and corresponds to the color filter array, the color filters including first filters corresponding to at least one first color, and second filters corresponding to at least two second colors having a lower contribution ratio for acquiring a luminance signal than the first color, the color filters being placed on a plurality of pixels including photo-electric conversion elements arranged in a first direction and a second direction perpendicular to the first direction;
an operation step of calculating a product-sum operation value for the first color and a product-sum operation value for each color among the second colors, based on first weighting coefficients and second weighting coefficients and on a pixel value of a pixel of the first color and a pixel value of a pixel of each color of the second colors in a local area extracted from the mosaic image and corresponding to a predetermined kernel size, the operation step performing calculation using the first weighting coefficients configured to correspond to each color among the second colors and correspond to the first color in the predetermined kernel size, and the second weighting coefficients configured to correspond to each color among the second colors, the first weighting coefficients and the second weighting coefficients being configured such that a ratio between a total sum of the first weighting coefficients and a total sum of the second weighting coefficients on pixel lines in the first direction and the second direction in the kernel size is 1:1; and
an image processing step of calculating a pixel value of each color of the second colors at a pixel position of each pixel to be processed in the local area, based on the pixel value of the first color at the pixel position, and the product-sum operation value for the first color and the product-sum operation value for each color among the second colors calculated by the operation step,
the processor repeatedly operating processes by the operation step and the image processing step while shifting the local area by units of object pixels to be processed with respect to the mosaic image.

* * * * *